(12) United States Patent
Takano et al.

(10) Patent No.: US 9,216,790 B2
(45) Date of Patent: Dec. 22, 2015

(54) VEHICLE

(71) Applicant: Yamaha Hatsudoki Kabushiki Kaisha, Iwata-shi, Shizuoka (JP)

(72) Inventors: Kazuhisa Takano, Shizuoka (JP); Toshio Iizuka, Shizuoka (JP); Yutaka Kubo, Shizuoka (JP); Takahiro Watanabe, Shizuoka (JP); Noboru Miyamoto, Shizuoka (JP); Kaoru Sasaki, Shizuoka (JP); Hirokatsu Ogawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/430,373

(22) PCT Filed: Sep. 24, 2013

(86) PCT No.: PCT/JP2013/075691
§ 371 (c)(1),
(2) Date: Mar. 23, 2015

(87) PCT Pub. No.: WO2014/046282
PCT Pub. Date: Mar. 27, 2014

(65) Prior Publication Data
US 2015/0246704 A1    Sep. 3, 2015

(30) Foreign Application Priority Data

Sep. 24, 2012  (JP) .................. 2012-209873
Sep. 24, 2012  (JP) .................. 2012-209874
Dec. 21, 2012  (JP) .................. 2012-279974

(51) Int. Cl.
*B62K 5/08* (2006.01)
*B60G 17/005* (2006.01)
(Continued)

(52) U.S. Cl.
CPC ... *B62K 5/08* (2013.01); *B60G 3/01* (2013.01); *B60G 3/20* (2013.01); *B60G 17/005* (2013.01);
(Continued)

(58) Field of Classification Search
CPC .............. B62D 9/02; B62K 5/08; B62K 5/10; B62K 5/05; B60G 3/20; B60G 3/01; B60G 17/005
See application file for complete search history.

(56) References Cited

U.S. PATENT DOCUMENTS 4,351,410 A    9/1982  Townsend
D547,242 S     7/2007  Lambri
(Continued)

FOREIGN PATENT DOCUMENTS

CN    100537283 C    9/2009
CN    201670311 U    12/2010
(Continued)

OTHER PUBLICATIONS

Official Communication issued in corresponding European Patent Application No. 13838840.0, mailed on Sep. 18, 2015.
(Continued)

*Primary Examiner* — Kevin Hurley
*Assistant Examiner* — Gabriela C Craciun
(74) *Attorney, Agent, or Firm* — Keating and Bennett, LLP

(57) ABSTRACT

A vehicle includes a stop element supported on a first support portion which is provided on any one of a link mechanism, a body frame, a right shock absorbing device, and a left shock absorbing device at a first end portion thereof so as to turn about a support axis of the first support portion, a lock caliper supported on a second support portion which is displaced relative to the first support portion and which is provided on any one of the link mechanism, the body frame, the right shock absorbing device, and the left shock absorbing device and which is configured to change a frictional force with the stop element, and a guide member which guides a middle portion or a second end portion of the extended member to the lock caliper. A turning angle of the stop element relative to the first support portion based on a turning operation of a first cross member and a second cross member relative to the body frame is smaller than a turning angle of the first cross member or a turning angle of the second cross member relative to the body frame based on the turning operation.

9 Claims, 21 Drawing Sheets

(51) Int. Cl.
  *B62K 5/05*   (2013.01)
  *B60G 3/01*   (2006.01)
  *B60G 3/20*   (2006.01)
  *B62K 21/00*  (2006.01)
  *B62D 9/02*   (2006.01)
  *B62K 5/10*   (2013.01)

(52) U.S. Cl.
  CPC ... *B62D 9/02* (2013.01); *B62K 5/05* (2013.01); *B62K 5/10* (2013.01); *B62K 21/00* (2013.01); *B60G 2300/45* (2013.01)

(56) References Cited

U.S. PATENT DOCUMENTS

| | | | |
|---|---|---|---|
| 8,070,172 | B1 | 12/2011 | Smith et al. |
| 2005/0167174 | A1 | 8/2005 | Marcacci |
| 2005/0167217 | A1 | 8/2005 | Marcacci |
| 2006/0255550 | A1 | 11/2006 | Pfeil et al. |
| 2007/0029751 | A1* | 2/2007 | Marcacci ............ B62D 9/02 280/124.1 |
| 2007/0262656 | A1* | 11/2007 | Fulks ............ B60G 21/007 307/143 |
| 2008/0197597 | A1 | 8/2008 | Moulene et al. |
| 2009/0299565 | A1 | 12/2009 | Hara et al. |
| 2010/0032914 | A1 | 2/2010 | Hara et al. |
| 2010/0044977 | A1* | 2/2010 | Hughes ............ B60G 21/007 280/5.509 |
| 2010/0096207 | A1* | 4/2010 | Nagao ............ B62K 25/24 180/223 |
| 2014/0238764 | A1* | 8/2014 | Tsujii ............ B62M 7/12 180/216 |
| 2014/0375015 | A1 | 12/2014 | Yu |
| 2015/0197304 | A1* | 7/2015 | Kroening, Jr. ........ B62K 13/04 180/209 |
| 2015/0239522 | A1* | 8/2015 | Iizuka ............ B62K 5/08 280/267 |
| 2015/0246704 | A1* | 9/2015 | Takano ............ B60G 17/005 280/269 |
| 2015/0251719 | A1* | 9/2015 | Takano ............ B60G 3/01 280/267 |

FOREIGN PATENT DOCUMENTS

| | | |
|---|---|---|
| CN | 202414056 U | 9/2012 |
| DE | 10 2010 052 716 A1 | 6/2011 |
| EP | 1 571 016 A1 | 9/2005 |
| JP | 2005-313876 A | 11/2005 |
| JP | 2009-286266 A | 12/2006 |
| JP | 2010-058783 A | 3/2010 |
| JP | 2011-195100 A | 10/2011 |
| JP | 4845585 B2 | 12/2011 |
| WO | 2007/127783 A1 | 11/2007 |

OTHER PUBLICATIONS

Official Communication issued in International Patent Application No. PCT/JP2013/075691, mailed on Dec. 24, 2013.
Piaggio, "Catalogo Parti Di Ricambio", NTRC000U01, MP3 300 ie LT Mod. ZAPM64102, 116 pages.

* cited by examiner though a function is provided which suppresses the operation of the link

VEHICLE

BACKGROUND OF THE INVENTION

1. Field of the Invention

The present invention relates to a vehicle equipped with a leanable body frame and two front wheels.

2. Description of the Related Art

A known vehicle includes a body frame that leans in the left-right or left-and-right direction while the vehicle is cornering and two front wheels which are provided so as to be aligned side by side in the left-and-right direction of the body frame (for example, refer to Japanese Patent Unexamined Publication JP A-2005-313876, U.S. Design Pat. D547,2425, and Catalogo partidi ricambio, MP3 300 64102 ie LT Mod. ZAPM64102, Piaggio).

The vehicle equipped with the leanable body frame and the two front wheels includes a link mechanism. The link mechanism includes an upper cross member and a lower cross member. In addition, the link mechanism also includes a right side rod which supports the right end portions of the upper cross member and the lower cross member and a left side rod which supports the left end portions of the upper cross member and the lower cross member. The upper cross member and the lower cross member are supported on the body frame at their middle portions directly in front of a steering shaft. The upper cross member and the lower cross member are supported on the body frame so as to be turnable about axes extending in the front-rear direction or substantially in the front-rear direction of the body frame. The upper cross member and the lower cross member turn relative to the body frame as the body frame leans, such that the relative positions of the two front wheels in the up-and-down direction change. The upper cross member and the lower cross member are provided higher in the up-and-down direction of the body frame than the two front wheels with the body frame standing in an upright state.

The vehicle equipped with the leanable body frame and the two front wheels includes a right shock absorbing device to support the right front wheel so that the right front wheel is movable in the up-and-down direction of the body frame and a left shock absorbing device to support the left front wheel so that the left front wheel is movable in the up-and-down direction of the body frame. The right shock absorbing device is supported on the right side rod so as to be turnable about the axis of the right side rod. The left shock absorbing device is supported on the left side rod so as to be turnable about the axis of the left side rod. The vehicle disclosed in Japanese Patent Unexamined Publication JP A-2005-313876 further includes a handlebar, a steering shaft, and a turning transmission mechanism. The handlebar is secured to the steering shaft. The steering shaft is supported on the body frame so as to be turnable relative thereto. When the handlebar is steered, the steering shaft turns accordingly. The turning transmission mechanism transfers the turning motion of the steering shaft to the right shock absorbing device and the left shock absorbing device.

The vehicle equipped with the leanable body frame and the two front wheels includes a number of on-board components which are provided around the steering shaft. The on-board components include lamps such as a headlamp, a radiator, a reservoir tank, electric components such as a horn, a main switch of the vehicle, a storage box, a storage pocket and the like.

The vehicle disclosed in Japanese Patent Unexamined Publication JP A-2005-313876 includes a resisting force change mechanism. The resisting force change mechanism suppresses the leaning of the body frame and the change in relative position of the two front wheels in the up-and-down direction of the body frame by increasing a resisting force against the operation of the link mechanism.

In the vehicle disclosed in Japanese Patent Unexamined Publication JP A-2005-313876, the resisting force change mechanism includes a brake disc and a caliper. The brake disc is fixed to the upper cross member of the link mechanism. The caliper changes the resisting force exerted on the operating link mechanism by changing the frictional force between the caliper and the brake disc. The caliper is attached to a portion of the body frame which is situated above the upper cross member. The link mechanism operates when the resisting force exerted by the resisting force change mechanism is zero or small. When the resisting force exerted by the resisting force change mechanism is large, the operation of the link mechanism is prevented or stopped. When the resisting force exerted by the resisting force change mechanism is small, the brake disc and the upper cross member move together relative to the body frame.

Since the caliper and the disc brake are used and change the frictional force by using mechanical contact, it is easy to make the frictional force zero or very small. Because of this, the resisting force change mechanism which includes the caliper and the disc brake causes the link mechanism to operate smoothly when the resisting force exerted by the resisting force change mechanism is zero or small. On the other hand, since the caliper and the disc brake are used and change the frictional force by using mechanical contact, it is necessary to ensure a large area for the surface of the disc brake with which the caliper is brought into contact. This requires a large caliper and a large brake disc. As a result, the resisting force change mechanism is large in size.

The vehicle disclosed in Japanese Patent Unexamined Publication JP A-2005-313876 is equipped with the link mechanism which moves as the body frame leans around the steering shaft. In addition, the vehicle includes around the steering shaft the large resisting force change mechanism which operates as the body frame leans and the link mechanism operates. Because of this, in the vehicle equipped with the leanable body frame and the two front wheels, the resisting force change mechanism needs to be arranged so that the movable range of the link mechanism and the large movable range of the resisting force change mechanism do not interfere with each other. Further, when mounting the on-board components, the on-board components need to be provided so as to avoid interference with the movable range of the link mechanism and the large movable range of the resisting force change mechanism. Because of this, in the vehicle equipped with the leanable body frame and the two front wheels, the peripheral construction of the steering shaft tends to be large.

SUMMARY OF THE INVENTION

Preferred embodiments of the present invention provide a vehicle equipped with a leanable body frame and two front wheels that prevent enlargement of a peripheral construction of a steering shaft above the two front wheels while ensuring a smooth operation of a link mechanism even though a function is provided which suppresses the operation of the link mechanism.

To solve the above-described problem, a vehicle according to a preferred embodiment of the present invention includes a body frame including a headpipe; a right front wheel and a left front wheel disposed side by side in a left-and-right direction of the body frame; a right shock absorbing device supporting the right front wheel at a lower portion thereof and configured to absorb displacement of the right front wheel in an up-and-down direction of the body frame with respect to an upper portion thereof; a left shock absorbing device supporting the left front wheel at a lower portion thereof and configured to absorb displacement of the left front wheel in the up-and-down direction of the body frame with respect to an upper portion thereof; a link mechanism including a right side rod which turnably supports the upper portion of the right shock absorbing device around a right axis extending in the up-and-down direction of the body frame, a left side rod which turnably supports the upper portion of the left shock absorbing device around a left axis parallel or substantially parallel to the right axis, an upper cross member including a right end portion turnably supporting the upper portion of the right side rod, a left end portion turnably supporting the upper portion of the left side rod, and an intermediate portion turnably supported by the body frame around an upper axis extending in a front-and-rear direction of the body frame, and a lower cross member including a right end portion turnably supporting a lower portion of the right side rod, a left end portion turnably supporting a lower portion of the left side rod, and an intermediate portion turnably supported by the body frame around a lower axis which is parallel or substantially parallel to the upper axis; a steering shaft supported on the headpipe between the right side rod and the left side rod in the left-and-right direction of the body frame, and including an upper end portion arranged above the lower axis which is a turning axis of the lower cross member in the up-and-down direction of the body frame, and turnable with respect to the headpipe around an intermediate axis extending in the up-and-down direction of the body frame; a handlebar provided on an upper end portion of the steering shaft; a turning transmission mechanism configured to transfer a turning motion of the steering shaft corresponding to an operation of the handlebar to the right shock absorbing device and to the left shock absorbing device; and a resisting force changing mechanism configured to change a resisting force exerted against a turning operation of the upper cross member and the lower cross member with respect to the body frame; wherein the resisting force changing mechanism includes an extended member including a first end supported on a first support portion provided on any one of the link mechanism, the body frame, the right shock absorbing device, and the left shock absorbing device, and which is turnable around a support axis of the first support portion; a frictional force change member supported on a second support portion provided on any one of the link mechanism, the body frame, the right shock absorbing device, and the left shock absorbing device which are configured to be displaced relative to the first support portion and to change a frictional force with the extended member; and a guide member configured to guide a middle portion or the second end portion of the extended member to the frictional force change member, and a turning angle of the extended member relative to the first support portion resulting from a turning operation of the upper cross member and the lower cross member relative to the body frame is smaller than a turning angle of the upper cross member or a turning angle of the lower cross member relative to the body frame resulting from the turning operation.

The vehicle includes the resisting force change mechanism which includes the extended member, the frictional force change member, and the guide member. The extended member is supported on the first support portion which is provided on any one of the link mechanism, the body frame, the right shock absorbing device, and the left shock absorbing device at the first end portion and is turnable about the support axis of the first support portion. The frictional force change member is supported on the second support portion which is provided on any one of the link mechanism, the body frame, the right shock absorbing device, and the left shock absorbing device and is configured to be displaced relative to the first support portion, and to change the frictional force with the extended member. The guide member is configured to guide the middle portion or the second end portion of the extended member to the frictional force change member. The link mechanism operates when the resisting force exerted by the resisting force change mechanism is zero or small. When the resisting force exerted by the resisting force change mechanism is large, the operation of the link mechanism is prevented or stopped. Since the vehicle uses the extended member and the frictional force change member which change the frictional force by using mechanical contact, it is easy to make the frictional force zero or very small. Because of this, the resisting force change mechanism makes the link mechanism operate smoothly when the resisting force exerted by the resisting force change mechanism is zero or small.

Further, the turning angle of the extended member relative to the first support portion resulting from the turning operation of the upper cross member and the lower cross member relative to the body frame is smaller than the turning angle of the upper cross member or the turning angle of the lower cross member relative to the body frame resulting from the turning operation. This configuration prevents enlargement of the movable range of the resisting force change mechanism due to the turning operation of the upper cross member and the lower cross member relative to the body frame.

Thus, it is possible to prevent enlargement of the peripheral construction of the steering shaft which is above the two front wheels while ensuring the smooth operation of the link mechanism even though the function is provided which suppresses the operation of the link mechanism for the vehicle equipped with the leanable body frame and two front wheels.

In a vehicle according to a preferred embodiment of the present invention, at least a portion of the extended member is preferably curved when seen in a view of the support axis of the first support portion.

The link mechanism is configured to perform a plurality of turning motions between the individual constituent members. Because of this, a displacement in the turning direction is included in a displacement between the first support portion and the second support portion. According to this configuration, the movable range of the extended member is reduced in size by providing the extended member with a curved shape. Consequently, enlargement of the peripheral structure of the steering shaft which is above the two front wheels is further prevented while ensuring the smooth operation of the link mechanism.

In a vehicle according to a preferred embodiment of the present invention, one of the extended member and the frictional force change member is preferably supported on one of the upper cross member and the lower cross member. Further, in an upright state of the body frame, a distance between the first end and the second end of the extended member in the left-and-right direction is preferably longer than a distance between the first end and the second end of the extended member in the up-and-down direction.

The upper cross member and the lower cross member turn relative to the body frame, the right side rod, the left side rod, the right shock absorbing device, and the left shock absorbing device. According to this configuration, the extended member moves along the longitudinal direction of the extended member as the upper cross member or the lower cross member turns. This makes the movable range of the extended member small. Consequently, enlargement of the peripheral structure of the steering shaft which is above the two front wheels is further prevented while ensuring the smooth operation of the link mechanism.

In a vehicle according to a preferred embodiment of the present invention, one of the extended member and the frictional force change member is preferably supported on any one of the body frame, the right side rod, and the left side rod. Further, in an upright state of the body frame, a distance between the first end and the second end of the extended member in the left-and-right direction is preferably longer than a distance between the first end and the second end of the extended member in the up-and-down direction.

According to this configuration, similar to the upper cross member and the lower cross member, the extended member is longer in the left-and-right direction of the body frame. Moreover, the extended member turns relative to the body frame, the right side rod, and the left side rod as the upper cross member and the lower cross member turn. This helps to easily avoid interference between the extended member and the upper cross member or the lower cross member even though the extended member is disposed in a position near the upper cross member or the lower cross member. This enables the movable range of the extended member and the movable range of the upper cross member or the lower cross member to approach each other or to overlap each other. Consequently, enlargement of the peripheral structure of the steering shaft which is above the two front wheels is further prevented while ensuring the smooth operation of the link mechanism.

In a vehicle according to a preferred embodiment of the present invention, the extended member is preferably provided directly behind the link mechanism in the front-and-rear direction of the body frame.

According to this configuration, it is possible to effectively use the space directly in front of the body frame for installation space for on-board components or the like. In addition, it is possible to prevent enlargement of the peripheral construction of the steering shaft.

Further, in a vehicle according to a preferred embodiment of the present invention, the frictional force change member is preferably arranged below the lower cross member in the up-and-down direction of the body frame.

According to this configuration, since the frictional force change member, which tends to be heavy, is disposed below the lower cross member, it is possible to lower the center of gravity of the vehicle body to a lower level than when it is disposed above the upper cross member. In addition, it is possible to prevent enlargement of the peripheral construction of the steering shaft.

Further, in a vehicle according to a preferred embodiment of the present invention, the body frame preferably includes a down frame extending rearwards and downwards from the headpipe, and in a front view of the vehicle, the frictional force change member is preferably provided to a side of the down frame.

According to this configuration, since the frictional force change member is disposed to a side of the down frame in a front view of the vehicle, it is possible to effectively use the space to a side of the down frame at a front portion of the vehicle. Consequently, compared with the case where the frictional force change member is disposed directly in front of the link mechanism, the space is secured for installation of on-board components such as accessories or the like which are desired to be disposed directly in front of the link mechanism, thus making it possible to enhance the degree of freedom in designing the arrangement of accessories at the front portion of the vehicle. In addition, it is possible to prevent enlargement of the peripheral construction of the steering shaft.

Further, in a vehicle according to a preferred embodiment of the present invention, the first support portion is preferably provided on the lower cross member, and the first support portion is preferably provided in a position which is spaced apart in a radial direction from the lower axis.

According to this configuration, the first support portion is disposed in the position which is spaced apart in a radial direction from the lower axis which is the turning axis of the lower cross member. In the event that the distance from the lower axis, which is the turning axis of the lower cross member, to the first support portion is long, the frictional force is reduced accordingly which is necessary to suppress the movement of the extended member and suppress the operation of the link mechanism. Consequently, it is possible to achieve a reduction in the size of the frictional force change member. In addition, it is possible to prevent enlargement of the peripheral construction of the steering shaft.

Further, in a vehicle according to a preferred embodiment of the present invention, a movable range of the extended member in the up-and-down direction based on the turning operation of the upper cross member and the lower cross member relative to the body frame is preferably larger than a movable range of the extended member in a horizontal direction based on the turning operation of the upper cross member and the lower cross member relative to the body frame.

In the vehicle, with respect to the operation of the extended member associated with the leaning operation of the vehicle, a shift amount in the up-and-down direction relative to the guide member is larger than the horizontal shift amount. In this manner, with respect to the movable range of the extended member based on the turning operation of the upper cross member and the lower cross member relative to the body frame, a movable range in the up-and-down direction is larger than the horizontal movable range. Because of this, the extended member moves in the up-and-down direction. It is possible to effectively use a narrow space in the up-and-down direction in the vicinity of the steering shaft as the operation space of the extended member. In addition, it is possible to prevent enlargement of the peripheral construction of the steering shaft.

According to various preferred embodiments of the present invention, it is possible to provide a vehicle equipped with a leanable body frame and two front wheels which prevents enlargement of the peripheral construction of a steering shaft which is above the two front wheels while ensuring smooth operation of a link mechanism even though a function is provided which suppresses the operation of the link mechanism.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 9A and 9B show turning angles of individual components in the upright state and the leaned state, of which FIG. 9A shows a turning angle of a turning member relative to a body frame, and FIG. 9B shows a turning angle of an extended member relative to the body frame.

DETAILED DESCRIPTION OF THE PREFERRED EMBODIMENTS

Hereinafter, the present invention will be described based on preferred embodiments by reference to the drawings.

First Preferred Embodiment

Hereinafter, a first preferred embodiment of a vehicle will be described based on FIGS. 1 to 15.

Figure 1:
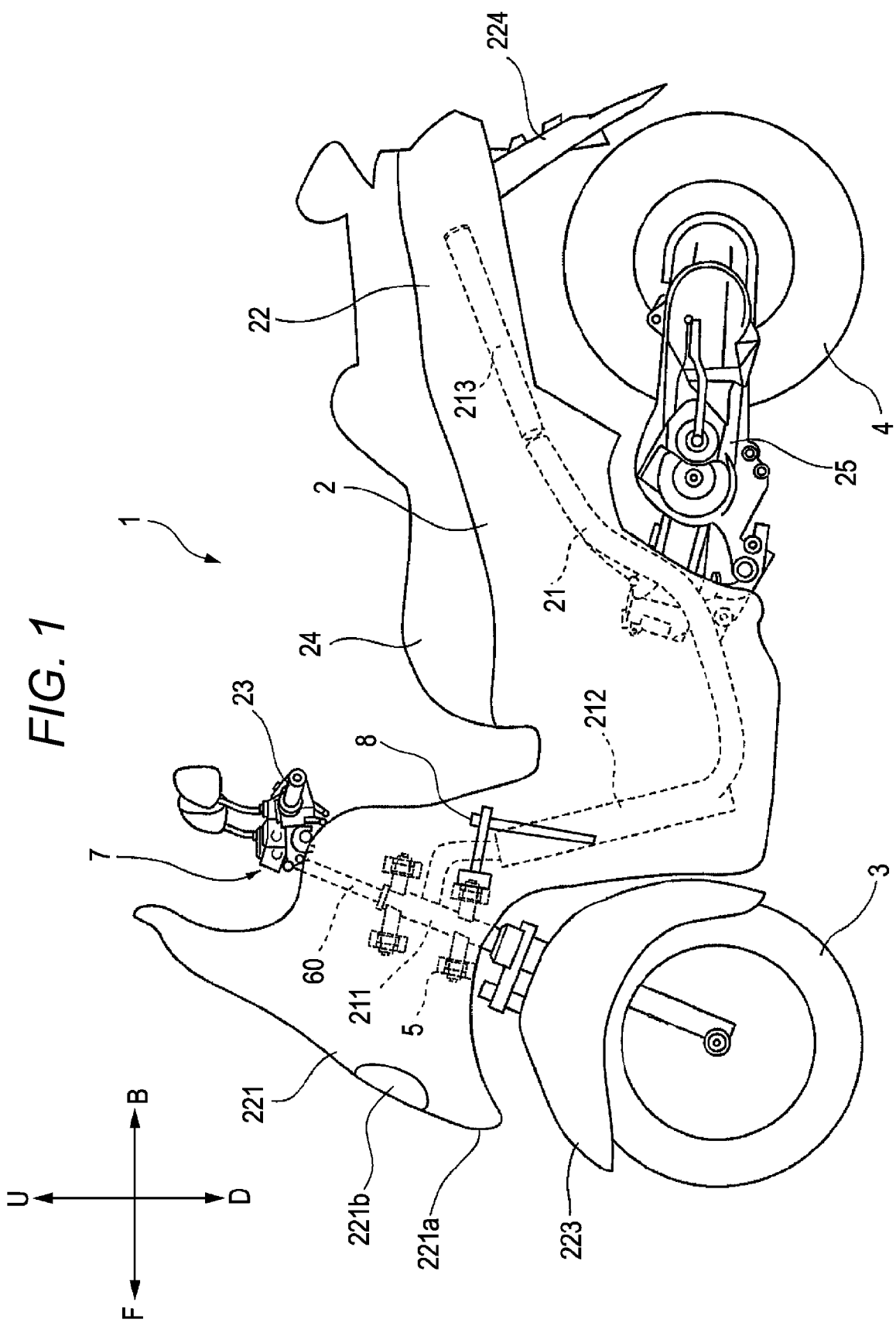
FIG. 1 is an overall side view of a vehicle according to a preferred embodiment of the present invention.

FIG. 1 shows an overall left side view of a straddle-type vehicle 1 with two front wheels which represents one type of a vehicle according to the first preferred embodiment of the present invention. Hereinafter, in the drawings, an arrow F denotes a forward direction of the vehicle 1, and an arrow B denotes a rearward direction of the vehicle 1. Additionally, in the drawings, an arrow R denotes a rightward direction of the vehicle 1, and an arrow L denotes a leftward direction of the vehicle 1. In addition, in the drawings, an arrow U denotes an upward direction of the vehicle 1, and an arrow D denotes a downward direction of the vehicle 1. When forward, rearward, leftward, and rightward directions are referred to in the following description, they denote forward, rearward, leftward, and rightward directions as seen from a rider of the vehicle 1. A transverse center indicates a central position in the direction of a width of the vehicle or in a transverse direction of the vehicle. A side to the vehicle in the transverse direction indicates a leftward or rightward direction as seen from the transverse center. When referred to in the following description, an axis extending in a front-and-rear direction is not necessarily limited to one parallel or substantially parallel to the front-and-rear direction. The axis extending in the front-and-rear direction indicates an axis which is inclined in the range of about ±45 degrees, for example, with respect to the front-and-rear direction. Similarly, an axis which extends in an up-and-down direction indicates an axis which is inclined in the range of about ±45 degrees, for example, with respect to the up-and-down direction. An axis which extends in the left-and-right direction indicates an axis which is inclined in the range of about ±45 degrees, for example with respect to the left-and-right direction. In addition, an upright state of a body frame indicates an upright state of the vehicle with no person riding the vehicle, no front wheels turned or leaned, and with an empty fuel tank.

As shown in FIG. 1, the vehicle 1 includes a vehicle main body portion 2, a pair of left and right front wheels 3 (refer to FIG. 2), a rear wheel 4, a steering mechanism 7, and a link mechanism 5.

The vehicle main body portion 2 includes a body frame 21, a body cover 22, a handlebar 23, a seat 24, and a power unit 25.

The body frame 21 includes a headpipe 211, a down frame 212, and a rear frame 213. Additionally, the body frame 21 supports the power unit 25, the seat 24, and the like. The power unit 25 includes an engine, a transmission, and the like. In FIG. 1, the body frame 21 is shown by a broken line.

The headpipe 211 is disposed in a front portion of the vehicle. The steering mechanism 7 and the link mechanism 5 are disposed around the periphery of the headpipe 211. The headpipe 211 supports the link mechanism 5. A portion of a tilt lock mechanism 8 is provided in the link mechanism 5. A steering shaft 60 is turnably inserted into the headpipe 211. The steering shaft 60 extends in the up-and-down direction. The handlebar 23 is attached to an upper end portion of the steering shaft 60. The down frame 212 extends downward and rearward from a front end. The down frame 212 is connected to the headpipe. The down frame 212 extends rearward and downward to the headpipe 211. The rear frame 213 supports the seat 24, a tail lamp, and the like.

The front wheels 3 are disposed below the headpipe 211 and the link mechanism 5. The front wheels 3 are disposed directly below a front cover 221. The rear wheel 4 is disposed directly below the body cover 22.

The body frame 21 is covered with the body cover 22. The body cover 22 includes the front cover 221, front fenders 223, and a rear fender 224.

The front cover 221 is positioned directly in front of the seat 24. The front cover 221 covers at least partially the steering mechanism 7, the link mechanism 5, and the tilt lock mechanism 8. The front cover 221 includes a front portion 221a which is disposed in front of the link mechanism 5. The front portion 221a of the front cover 221 is provided above the front wheels 3 in a side view of the vehicle 1. The front portion 221a of the front cover 221 is provided behind front ends of the front wheels 3 in a side view of the vehicle 1. Additionally, a headlamp 221b is provided in a portion of a front surface of the front cover 221.

The front fenders 223 are disposed directly below the front cover 221 and directly above individually the pair of left and right front wheels 3, 3. The rear fender 224 is disposed directly above the rear wheel 4.

Figure 2:
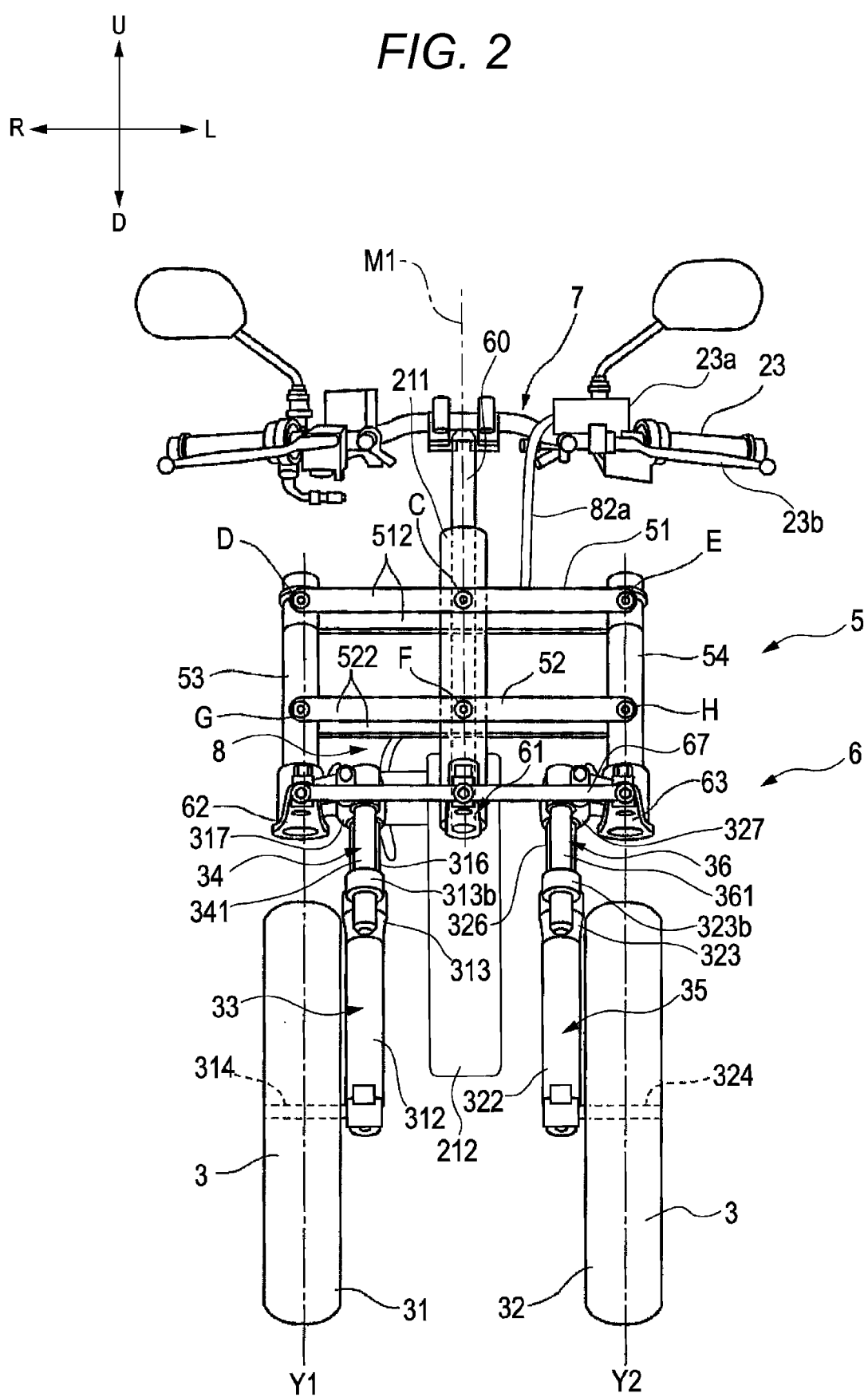
FIG. 2 is an overall front view of the vehicle with a body cover and front fenders removed.
Figure 3:
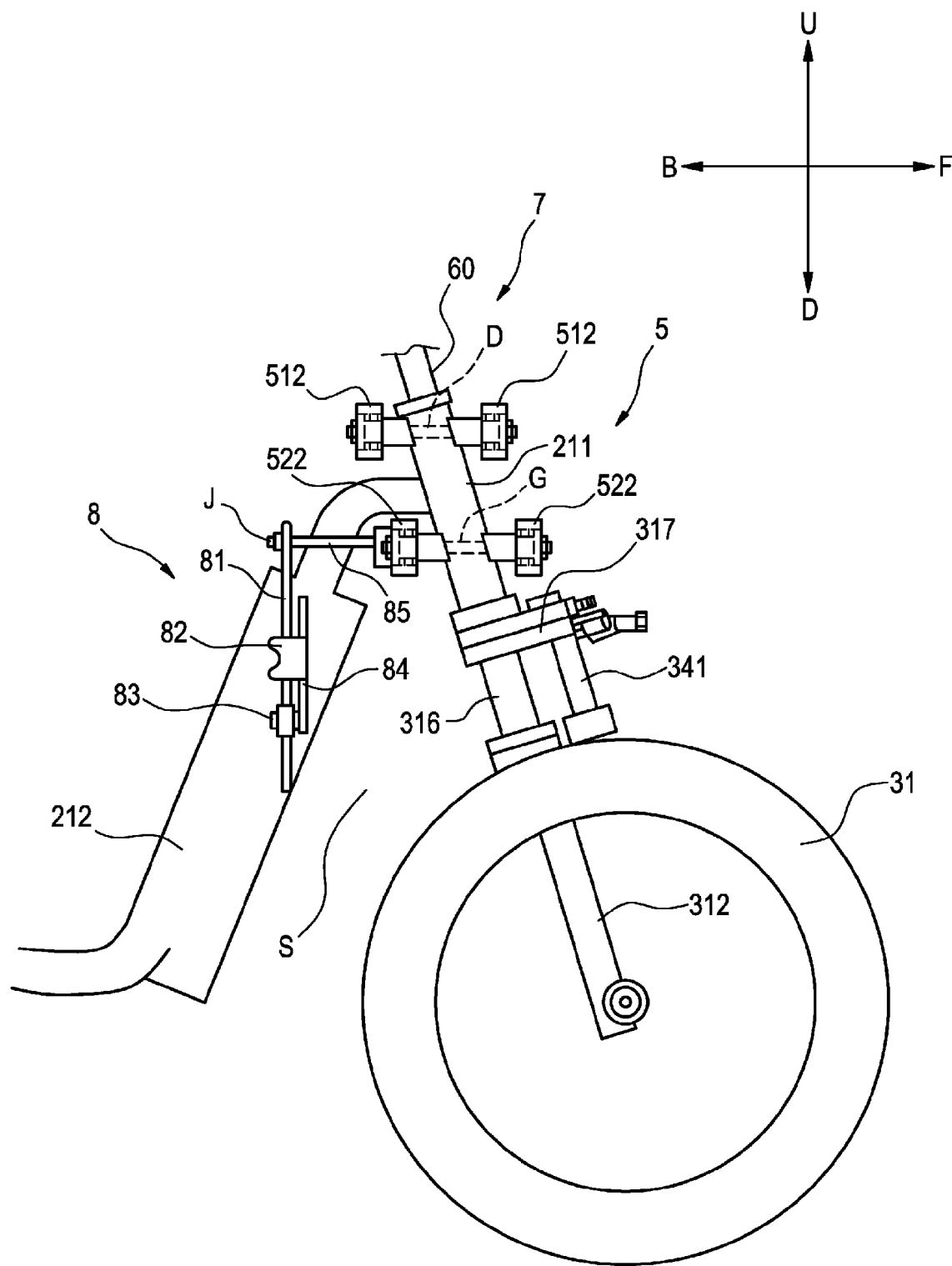
FIG. 3 is a partial side view of the vehicle with the body cover and the front fenders removed.
Figure 4:
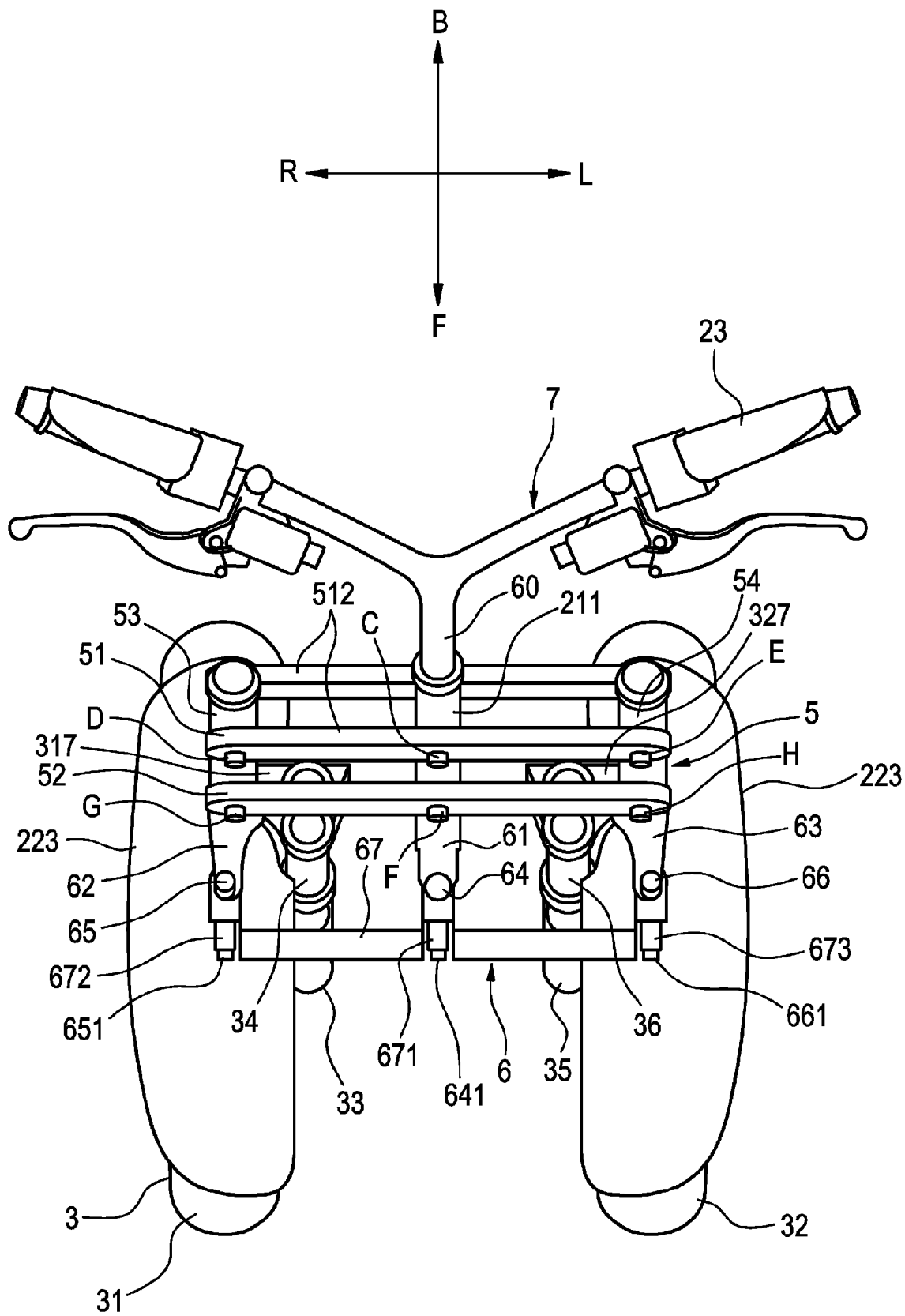
FIG. 4 is a partial plan view of the vehicle with the body cover removed.

FIG. 2 is an overall front view of the vehicle 1 with the body cover 22 and the front fenders 223 removed. FIG. 3 shows a partial right side view of the vehicle 1 with the body cover 22 and the front fenders 223 removed. FIG. 4 is a partial plan view of the vehicle with the body cover 22 removed.

As shown in FIGS. 2 to 4, the steering mechanism 7 includes the handlebar 23, the steering shaft 60, an operation force transfer mechanism 6, a first shock absorber 33, a first turning preventing mechanism 34, a second shock absorber 35, a second turning preventing mechanism 36, the pair of left and right front wheels 3, 3, a first bracket 317, a second bracket 327, and the like.

The front wheels 3 include a first front wheel 31 (an example of a right front wheel) and a second front wheel 32 (an example of a left front wheel) which are disposed side by side in the left-and-right direction of the body frame 21. The first front wheel 31 is disposed to the right in relation to the transverse center. The front fender 223 is disposed directly above the first front wheel 31. The second front wheel 32 is disposed to the left in relation to the transverse center. The second front wheel 32 is disposed so as to be symmetric with the first front wheel 31 with respect to the body frame 21. The front fender 223 is disposed directly above the second front wheel 32.

A first shock absorbing device (an example of a right shock absorbing device) supports the first front wheel 31 at a lower portion thereof. The first shock absorbing device is turnable about a first center axis Y1 together with the first front wheel 31 by steering the handlebar 23. The first shock absorbing device includes the first shock absorber 33 and the first bracket 317.

The first shock absorber 33 includes a first outer tube 312. The first front wheel 31 is supported on the first outer tube 312. The first front wheel 31 is supported at a lower portion of the first outer tube 312. The first outer tube 312 extends in the up-and-down direction and includes a first support shaft 314 at a lower end thereof. The first support shaft 314 supports the first front wheel 31. The first turning preventing mechanism 34 includes a first guide 313. The first guide 313 is disposed at an upper portion of the first outer cylinder 312. The first guide 313 is fixed to the upper portion of the first outer cylinder 312. The first front wheel 31 is supported so as to be turned about the first center axis Y1 to change the orientation thereof. In this manner, the first shock absorber 33 supports the first front wheel 31 at the lower portion thereof and absorbs a displacement of the first front wheel 31 in the up-and-down direction (refer to FIG. 6) of the body frame 21 with respect to the upper portion thereof.

A second shock absorbing device (an example of a left shock absorbing device) supports the second front wheel 32 at a lower portion thereof. The second shock absorbing device is turnable about a second center axis Y2 together with the second front wheel 32 by steering the handlebar 23. The second shock absorbing device includes the second shock absorber 35 and the second bracket 327.

The second shock absorber 35 includes a second outer tube 322. The second wheel 32 is supported on the second outer tube 322. The second front wheel 32 is supported at a lower portion of the second outer tube 322. The second outer tube 322 extends in the up-and-down direction and includes a second support shaft 324 at the lower portion thereof. The second support shaft 324 supports the second front wheel 32. The second turning preventing mechanism 36 includes a second guide 323. The second guide 323 is disposed at an upper portion of the second outer tube 322. The second guide 323 is fixed to the upper portion of the second outer tube 322. The second front wheel 32 is supported so as to be turned about the second center axis Y2 to change the orientation thereof. In this manner, the second shock absorber 35 supports the second front wheel 32 at the lower portion thereof and absorbs a displacement of the second front wheel 32 in the up-and-down direction (refer to FIG. 6) of the body frame 21 with respect to the upper portion thereof with respect to the upper portion thereof.

The first shock absorber 33 is preferably a so-called telescopic shock absorber, for example, and dampens vibrations from a road surface. The first shock absorber 33 includes the first outer tube 312 and a first inner tube 316. The first inner tube 316 is disposed directly above the first outer tube 312. A portion of the first inner tube 316 is inserted into an interior (an inner circumferential side) of the first outer tube 312. The first inner tube 316 moves relative to the first outer tube 312 in relation to the direction in which the first outer tube 312 extends. An upper portion of the first inner tube 316 is fixed to the first bracket 317.

The first turning preventing mechanism 34 prevents the turning of the first outer tube 312 relative to the first inner tube 316. The first turning preventing mechanism 34 includes the first guide 313, a first turning preventing rod 341, and the first bracket 317. The first guide 313 guides the first turning preventing rod 341 in a direction in which it moves. The first guide 313 includes a first guide tube 313b. The first turning preventing rod 341 is inserted into an interior (an inner circumferential side) of the first guide tube 313b. The first turning preventing rod 341 moves relative to the first guide tube 313b. The first turning preventing rod 341 prevents the relative turning of the first front wheel 31 to the first inner tube 316. The first turning preventing rod 341 is disposed parallel or substantially parallel to the first shock absorber 33. An upper portion of the first turning preventing rod 341 is fixed to the first bracket 317. The first turning preventing rod 341 cannot move relative to the first inner tube 316. The first bracket 317 fixes the first inner tube 316 and the first turning preventing rod 341 together.

The second shock absorber 35 is preferably a so-called telescopic shock absorber, for example, and dampens vibrations from a road surface. The second shock absorber 35 has a transversely symmetric configuration which is similar to that of the first shock absorber 33. The second shock absorber 35 includes the second outer tube 322 and a second inner tube 326. An upper portion of the second inner tube 326 is fixed to the second bracket 327.

The second turning preventing mechanism 36 prevents the relative turning of the second outer tube 322 to the second inner tube 326. The second turning preventing mechanism 36 has a transversely symmetric configuration which is similar to the first turning preventing mechanism 34. The second turning preventing mechanism 36 includes the second guide 323, a second guide tube 323b, a second turning preventing rod 361, and the second bracket 327. The second turning preventing rod 361 is disposed parallel or substantially parallel to the second shock absorber 35 and prevents the relative turning of the second front wheel 32 to the second inner tube 326.

The operation force transfer mechanism 6 (an example of a turning transmission mechanism) includes the steering shaft 60, a first transfer plate 61, a second transfer plate 62, a third transfer plate 63, a first joint 64, a second joint 65, a third joint 66, a tie-rod 67, the first bracket 317, and the second bracket 327.

The operation force transfer mechanism 6 is disposed above the first front wheel 31 and the second front wheel 32. The operation force transfer mechanism 6 transfers an operation force exerted on the handlebar 23 by the rider as a result of the rider operating the handlebar 23 to the first front wheel 31 and the second front wheel 32.

The first transfer plate 61 is connected to the steering shaft 60 so as not to turn relative thereto. The first transfer plate 61 turns as the steering shaft 60 turns.

The second transfer plate 62 is connected to a first side member 53 so as to turn relative thereto. The second transfer plate 62 is fixed to the first bracket 317. The second transfer plate 62 is disposed directly below the first bracket 317.

The third transfer plate 63 is connected to a second side member 54 so as to turn relative thereto. The third transfer plate 63 is disposed transversely symmetrical with the second transfer plate 62 with respect to the first transfer plate 61 in a front view. The third transfer plate 63 is fixed to the second bracket 327. The third transfer plate 63 is positioned directly below the second bracket 327.

The first joint 64 is disposed directly in front of the first transfer plate 61. The second joint 65 is disposed directly in front of the second transfer plate 62. The second transfer plate 62 is disposed directly to the right of the first transfer plate 61. The third joint 66 is disposed directly in front of the third transfer plate 63. The third transfer plate 63 is disposed directly to the left of the first transfer plate 61.

The tie-rod 67 transfers the operation force transferred from the steering shaft 60 to the first bracket 317 and the second bracket 327 via the first transfer plate 61, the second transfer plate 62 and the third transfer plate 63. The tie-rod 67 extends in the transverse direction. The tie-rod 67 includes a first front rod 641, a second front rod 651, and a third front rod 661. The first front rod 641 is supported at the first joint 64 so as to turn relative to the first transfer plate 61. The first front rod 641 is provided at a center of the tie-rod 67 in the left-and-right direction. The second front rod 651 is supported at the second joint 65 so as to turn relative to the second transfer plate 62. The second front rod 651 is disposed directly to the right of the first front rod 641. The third front rod 661 is supported at the third joint 66 so as to turn relative to the third transfer plate 63. The third front rod 661 is disposed directly to the left of the first front rod 641.

The tie-rod 67 includes a first ring 671, a second ring 672, and a third ring 673. The first front rod 641 is inserted into the first ring 671. The second front rod 651 is inserted into the second ring 672. The third front rod 661 is inserted into the third ring 673.

In this manner, the operation force transfer mechanism 6 is configured so as to transfer the turning of the steering shaft 60 corresponding to the operation of the handlebar 23 to the first shock absorber 33 and the second shock absorber 35.

In the present preferred embodiment, the link mechanism 5 is a parallelogrammatic link mechanism.

As shown in FIGS. 2 to 4, the link mechanism 5 is disposed below the handlebar 23. The link mechanism 5 is connected to the headpipe 211. The link mechanism 5 includes a first cross member 51 (an example of an upper cross member), a second cross member (an example of a lower cross member) 52, the first side member 53 (an example of a right side rod), and the second side member 54 (an example of a left side rod).

The first cross member 51 is supported on the headpipe 211 of the body frame 21 at a support portion C having a turning axis (an example of an upper axis) which extends in the front-and-rear direction of the body frame 21 and is turnable about a turning axis of the support portion C within a plane which includes the first cross member 51 and the second cross member 52.

The first cross member 51 includes a pair of plate-shaped members 512, 512 which extend in the transverse direction. The pair of plate-shaped members 512, 512 sandwiches the headpipe 211 therebetween in the front-and-rear direction. A right end of the first cross member 51 is connected to the first side member 53 at a connecting portion D. The first cross member 51 is attached to the first side member 53 so as to turn about a turning axis of the connecting portion D as a center of turning. A left end of the first cross member 51 is connected to the second side member 54 at a connecting portion E. The first cross member 51 is attached to the second side member 54 so as to turn about a turning axis of the connecting portion E as a center of turning. The first cross member 51 is turnable relative to the first side member 53 and the second side member 54 within the plane which includes the first cross member 51 and the second cross member 52.

The second cross member 52 is supported on the headpipe 211 of the body frame 21 at a support portion F having a turning axis (an example of a lower axis) which extends in the front-and-rear direction of the body frame 21 and is turnable about a turning axis of the support portion F within the plane which includes the first cross member 51 and the second cross member 52. The second cross member 52 is disposed below the first cross member 51. The second cross member 52 preferably has the same length as that of the first cross member 51 and is parallel or substantially parallel to the first cross member 51.

The second cross member 52 includes a pair of plate-shaped members 522, 522 which extend in the transverse direction. The pair of plate-shaped members 522, 522 sandwiches the headpipe 211 therebetween in the front-and-rear direction. A right end of the second cross member 52 is connected to the first side member 53 at a connecting portion G. The second cross member 52 is attached to the first side member 53 so as to turn about a turning axis of the connecting portion G as a center of turning. A left end of the second cross member 52 is connected to the second side member 54 at a connecting point H. The second cross member 52 is attached to the second side member 54 so as to turn about a turning axis of the connecting portion H as a center of turning. The second cross member 52 is turnable relative to the first side member 53 and the second side member 54 within the plane which includes the first cross member 51 and the second cross member 52.

The first side member 53 is disposed directly to the right of the headpipe 211 and extends parallel or substantially parallel to the direction in which the headpipe 211 extends. The first side member 53 is disposed directly above the first front wheel 31 and above the first shock absorber 33. The first bracket 317 is attached to the first side member 53 so as to turn about the first center axis Y1 (an example of a right axis) as a center of turning.

The second side member 54 is disposed directly to the left of the headpipe 211 and extends parallel or substantially parallel to the direction in which the headpipe 211 extends. The second side member 54 is disposed directly above the second front wheel 32 and above the second shock absorber 35. The second bracket 327 is attached to the second side member 54 so as to turn about the second center axis Y2 (an example of a left axis) as a center of turning.

In this manner, in the link mechanism 5 that is configured as described above, the headpipe 211 is supported between the first side member 53 and the second side member 54 in the left-and-right direction of the body frame 21. An upper end portion of the steering shaft 60 is provided above the turning axis which passes through the support portion F of the second cross member 52 in the up-and-down direction of the body frame and is supported on the headpipe 211 so as to turn about a middle axis M1 (refer to FIGS. 2 and 6) which extends in the up-and-down direction of the body frame 21.

Figure 5:
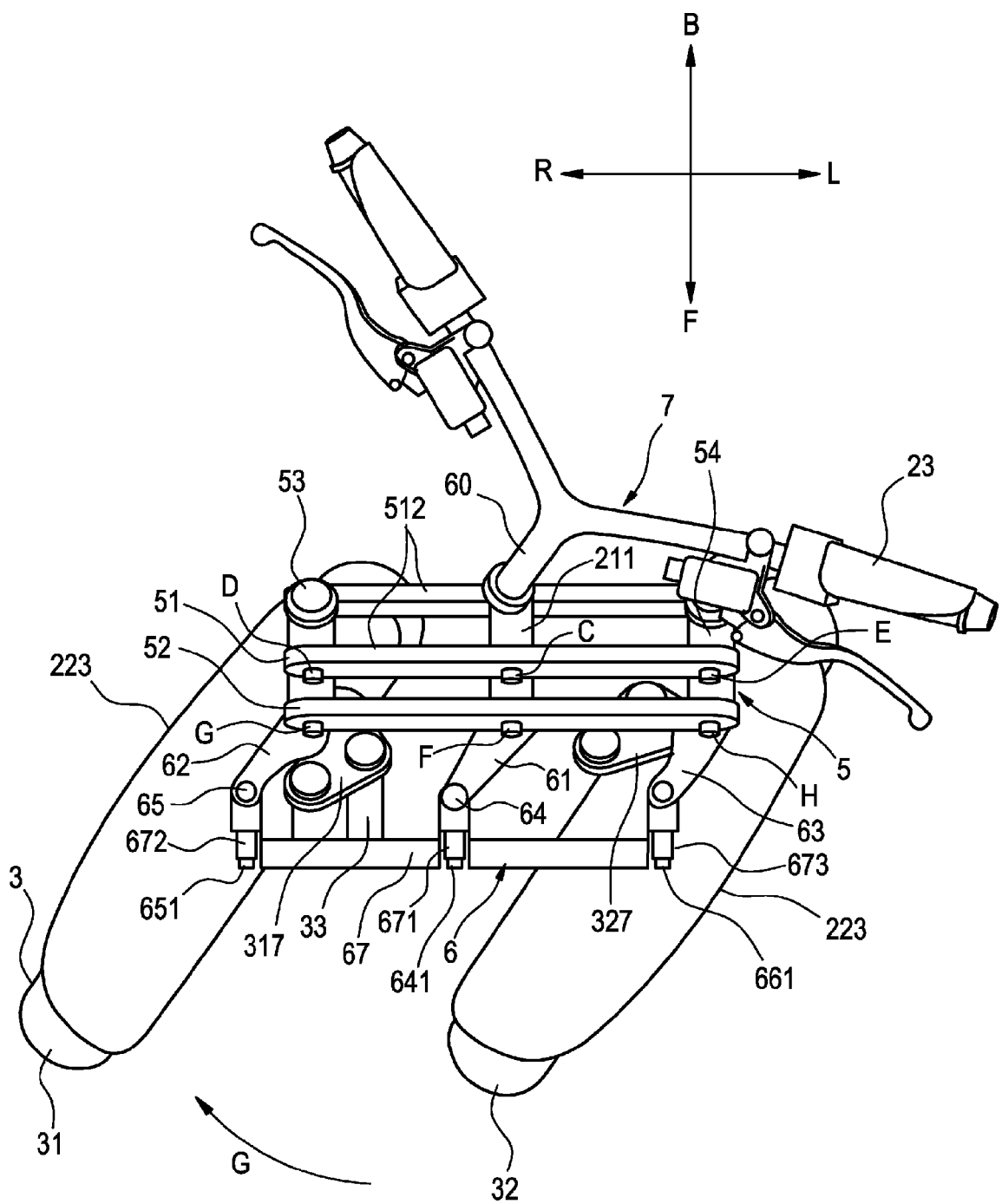
FIG. 5 is a partial plan view of the vehicle with the body cover removed, which depicts a steering operation.

FIG. 5 is a partial plan view of the vehicle 1 with the body cover removed, which depicts a steering operation.

As shown in FIG. 5, when the handlebar 23 is steered in a left-and-right direction, the operation force transfer mechanism 6 of the steering mechanism 7 operates to trigger a steering operation. When the steering shaft 60 turns as a result of the handlebar 23 being steered, the first transfer plate 61 turns in association with the turning of the steering shaft 60. For example, when the steering shaft 60 turns in a direction indicated by an arrow G in FIG. 5, the tie-rod 67 moves to the right rear as the first transfer plate 61 turns. As this occurs, since the tie-rod 67 is supported turnably on the first transfer plate 61 via the first joint 64, the tie-rod 67 moves to the right rear while maintaining its posture which is parallel or substantially parallel to the first cross member 51 and the second cross member 52. The second transfer plate 62 and the third transfer plate 63 turn in the direction indicated by the arrow G about the first side member 53 and the second member 54, respectively, as the tie-rod 67 moves to the right rear.

When the second transfer plate 62 and the third transfer plate 63 turn in the direction indicated by the arrow G, the first bracket 317 and the second bracket 327 turn in the direction indicated by the arrow G. When the first bracket 317 and the second bracket 327 turn in the direction indicated by the arrow G, the first front wheel 31 turns about the first center axis Y1 (refer to FIG. 2) via the first shock absorber 33, and the second front wheel 32 turns about the second center axis Y2 (refer to FIG. 2) via the second shock absorber 35.

Figure 6:
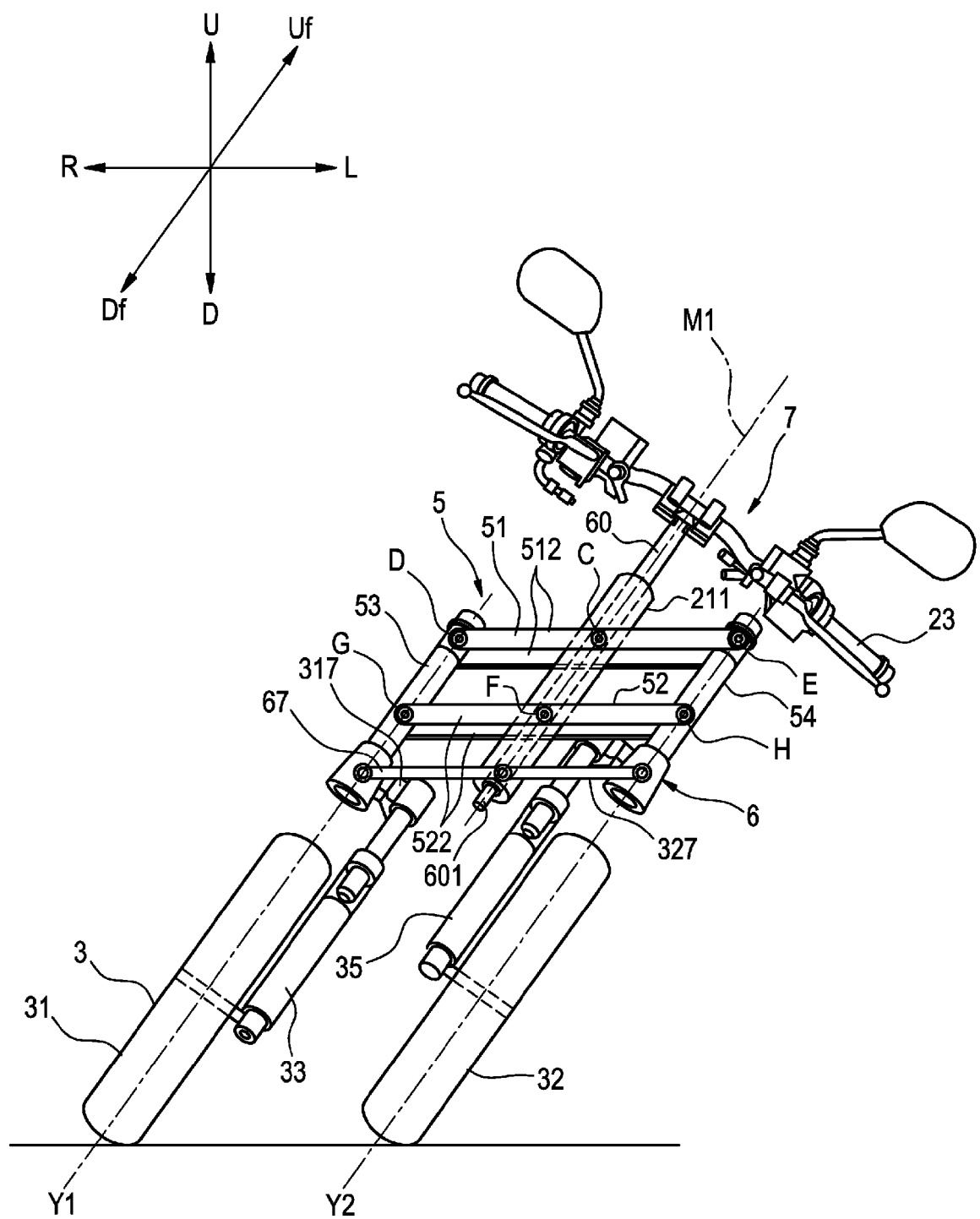
FIG. 6 is an overall front view of the vehicle with the body cover and the front fenders removed, which depicts a leaning operation.

FIG. 6 is an overall front view of the vehicle 1 with the body cover 22 and the front fenders 223 removed, which depicts a leaning operation. In FIG. 6, reference character Uf denotes an upward direction along the up-and-down direction of the body frame, and reference character Df denotes a downward direction along the up-and-down direction of the body frame.

As shown in FIG. 6, the vehicle 1 leans as the link mechanism 5 operates in the left-and-right direction. The link mechanism operates such that the individual members (the first cross member 51, the second cross member 52, the first side member 53 and the second side member 54) of the link mechanism turn relatively about their corresponding connecting points acting as turning axes such that the shape of the link mechanism 5 is changed. In the link mechanism 5 of the present preferred embodiment, the first cross member 51, the second cross member 52, the first side member 53, and the second side member 54 each take a rectangular or substantially rectangular shape in the front view, for example, with the vehicle body being in the upright state in which the vehicle body is not leaned. Then, when the vehicle body is leaned, those members are each deformed into a parallelogram. The link mechanism 5 leans as the first cross member 51, the second cross member 52, the first side member 53, and the second side member 54 turn, such that the first front wheel 31 and the second front wheel 32 are leaned.

For example, when the occupant leans the vehicle 1 to the left, the headpipe 211 leans to the left with respect to the perpendicular direction. When the headpipe 211 leans, the first cross member 51 turns relative to the headpipe 211 about the support portion C, and the second cross member 52 turns relative to the headpipe 211 about the support portion F. Then, the first cross member 51 moves to the left more than the second cross member 52, and the first side member 53 and the second side member 54 lean parallel or substantially parallel to the headpipe 211 with respect to the perpendicular direction. When the first side member 53 and the second side member 54 lean, the first side member 53 and the second side member 54 turn relative to the first cross member 51 and the second cross member 52. Consequently, when the rider leans the vehicle 1, the first front wheel 31 and the second front wheel 32, which are supported on the first side member 53 and the second side member 54, respectively, lean individually parallel or substantially parallel to the headpipe 211 with respect to the perpendicular direction as the first side member 53 and the second side member 54 lean.

Figure 7:
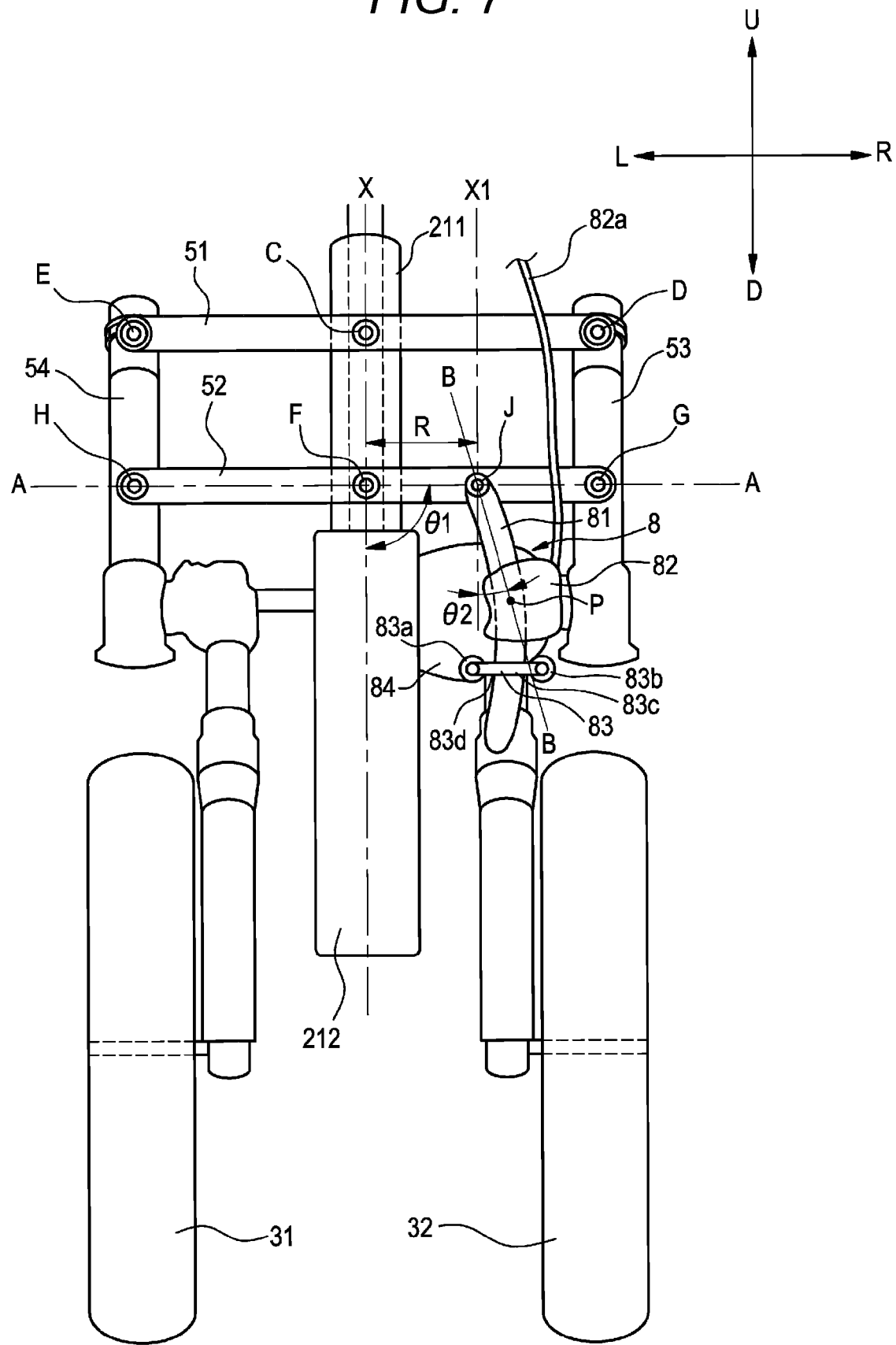
FIG. 7 is a partial rear view of the vehicle showing a tilt lock mechanism with the vehicle standing in an upright state.

The tilt lock mechanism suppresses the leaning operation of the link mechanism 5 described above as required to lock the leaning operation of the vehicle 1, for example, when the vehicle is brought to a standstill. FIG. 7 is a partial rear view of the vehicle 1 with the body cover 22 and the front fenders 223 removed, which shows a tilt lock mechanism 8 of the vehicle 1. As shown in FIGS. 1, 3 and 7, the tilt lock mechanism 8 is disposed behind the link mechanism 5 and behind the headpipe 211. The tilt lock mechanism 8 is disposed to a side of the down frame 212 of the body frame 21. The tilt lock mechanism 8 is disposed between the down frame 212 and the first side member 53 in a front view. The tilt lock mechanism 8 includes a stop element (an example of an extended member) 81, a lock caliper (an example of a frictional force change member) 82, a guide member 83, and the like.

The stop element 81 includes an extended flat plate which is slightly curved in the front view. The stop element 81 is made of a material such as iron, stainless steel, aluminum, carbon fiber reinforced composite material or the like. The stop element 81 is attached to the second cross member 52 so as to turn about a turning axis of a support portion J (an example of a first support portion). In the present preferred embodiment, a distal end of an attachment arm 85 which extends towards the rearward from the second cross member 52 is provided as the support portion J which supports the stop element 81. A first end portion of the stop element 81 is attached to this support portion J so as to turn about the turning axis thereof. The second end portion of the stop element 81 is suspended downwards by the weight of the stop element 81.

The support portion J is provided between the support portion F and the connecting portion G on the second cross member 52. The position of the support portion J on the second cross member 52 is spaced by a distance R in a radial direction of the turning shaft of the second cross member 52 from the position of the support portion F which defines the same turning shaft.

The lock caliper 82 suppresses the movement of the stop element 81 through mechanical contact. In the present preferred embodiment, the lock caliper 82 suppresses the movement of the stop element 81 by grabbing a portion of the stop element 81. The lock caliper 82 is attached to a mounting plate 84 (an example of a second support portion) which is provided on the down frame 212 and is disposed on a side of the down frame 212. The lock caliper 82 is disposed below the second cross member 52. The lock caliper 82 includes lock pads (not shown) of a high frictional material which are disposed in both positions in the direction of thickness of the stop element 81 (in the front-and-rear direction) so as to face the stop element 81. When in a waiting position, the lock caliper 82 stays in a position where the lock pads are not in contact with the stop element 81. On the other hand, when in an operating state, the lock pads are caused to approach each other and to be brought into contact with the stop element 81 from the front and rear thereof so that the lock pads hold the stop element 81 from the front and rear thereof.

One end portion of a hose 82*a* is connected to the lock caliper 82. The other end portion of the hose 82*a* is connected to a master cylinder 23*a* which is provided on the handlebar 23. The lock caliper 82 operates via the master cylinder 23*a* and the hose 82*a* by operating a lever 23*b* on the handlebar 23 and is then shifted from the waiting state to the operating state.

The guide member 83 guides the moving direction of the stop element 81. The guide member 83 is fixed to the mounting plate 84 and is disposed to a side of the down frame 212 and below the second cross member 52. The guide member 83 includes a left guide member 83*a*, a right guide member 83*b*, and a longitudinal guide member 83*c*. The left guide member 83*a* guides the stop element 81 while preventing a leftward movement of the stop element 81. The right guide member 83*b* guides the stop element 81 while preventing a rightward movement of the stop element 81. The left guide member 83*a* and the right guide member 83*b* include, for example, guide rollers which roll while in contact with left and right edge portions of the stop element 81. The longitudinal guide member 83*c* is a thin plate-shaped member which is fixed directly behind the left guide member 83*a* and the right guide member 83*b* at both end portions thereof and guides the stop element 81 while preventing a rearward movement of the stop element 81. The mounting plate 84 restricts a forward movement of the stop element 81. A guide hole 83*d* is provided which is defined by the left guide member 83*a*, the right guide member 83*b*, the longitudinal guide member 83*c*, and the mounting plate 84.

The stop element 81 is inserted through the guide hole 83*d* in such a state that the stop element 81 is in contact with any one of the left guide member 83*a*, the right guide member 83*b*, the longitudinal guide member 83*c*, and the mounting plate 84 which make up the guide hole 83*d* or is in contact with none of them. The size and position of the guide hole 83*d* are set so that the stop element 81 is positioned within a range where the lock caliper 82 holds the stop element 81 so as to suppress the movement of the stop element 81.

In this manner, the tilt lock mechanism 8 is configured to change a resisting force that is imparted to the turning motions of the first cross member 51 and the second cross member 52 relative to the body frame 21.

When attempting to maintain the posture of the vehicle 1 with the vehicle brought to a standstill, the tilt lock mechanism 8 is actuated to operate, so that the link mechanism 5 is restrained from performing a leaning operation (that is, the so-called tilt locking is in operation). The rider operates the lever 23*b* on the handlebar 23 to put the tilt lock mechanism 8 in operation. The force imparted to the master cylinder 23*a* by the lever 23*b* so operated is transferred to the lock caliper 82 via brake oil in the hose 82*a*. The lock caliper 82 presses the lock pads against the stop element 81 from the front and rear thereof (mechanical contact) to hold the stop element 81 between the lock pads. The lock pads hold the stop element 81 therebetween against the weight of the stop element 81 or an external force exerted on the stop element 81, such that a frictional force is generated between the stop element 81 and the lock pads to suppress the turning operation and shift operation of the stop element 81. When referred to herein, "suppress" indicates more than stopping the movement of the stop element 81 completely. For example, "suppress" also includes a state in which although the stop element 81 slides relative to the lock pads, the stop element 81 is held between the lock pads so that the frictional force makes it difficult for the stop element 81 to move.

The relative turning of the second cross member 52 of the link mechanism 5 to the headpipe 211 is suppressed as a result of the operation of the stop element 81 being suppressed. The suppression of the turning operation of the second cross member 52 suppresses in turn the leaning operation of the link mechanism 5. That is, the leaning operation of the link mechanism 5 is suppressed by actuating the tilt lock mechanism 8. In the vehicle 1 with the link mechanism 5 restrained from performing the leaning operation, the postures of the pair of front wheels 3 are maintained, for example, when the vehicle is at a standstill, and therefore, the vehicle 1 can stand alone.

In the waiting state of the tilt lock mechanism 8 in which the tilt lock mechanism 8 is not in operation, the stop element 81 is inserted through the guide hole 83*d* and is allowed to move.

Figure 8:
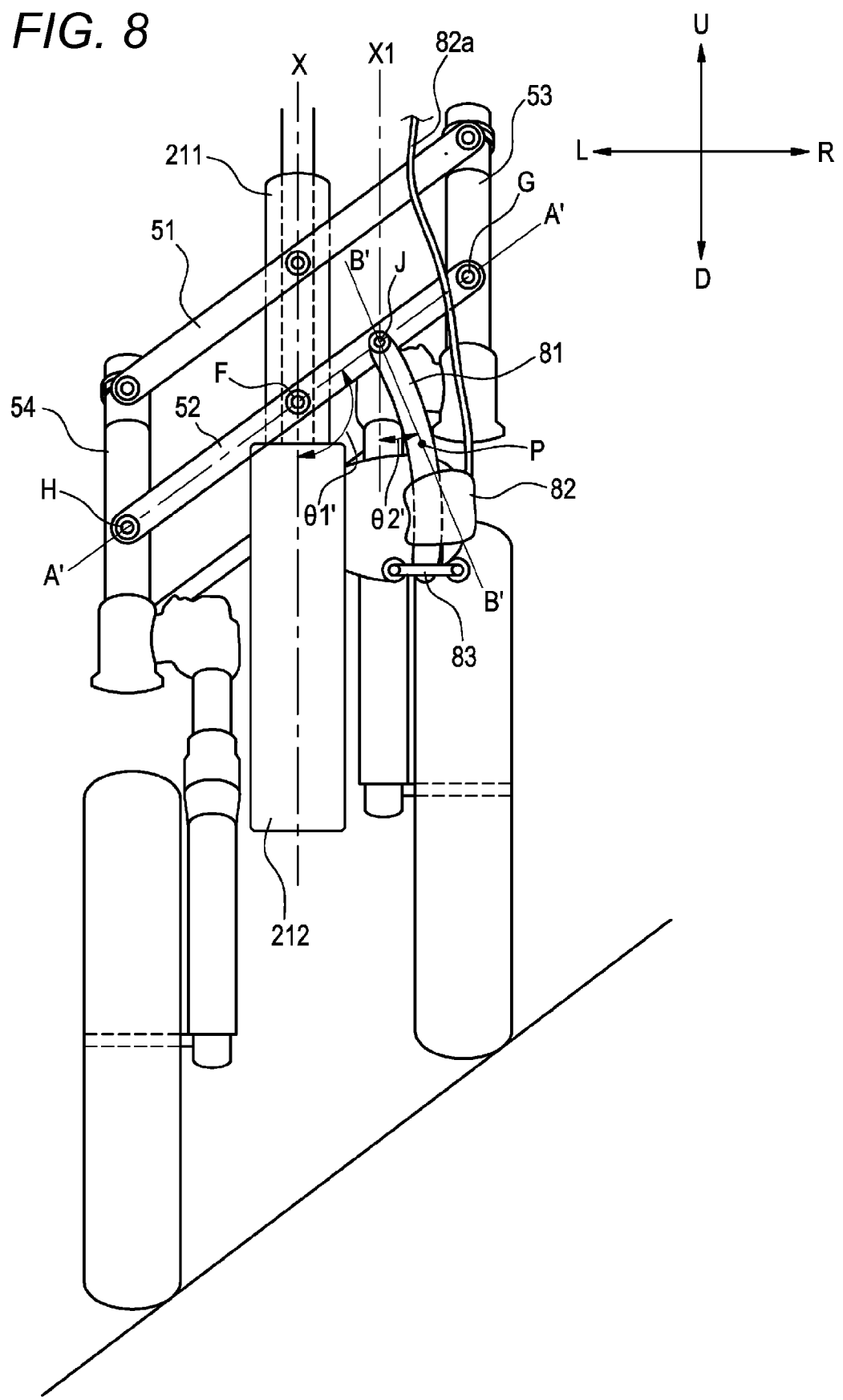
FIG. 8 is a partial rear view of the vehicle showing the tilt lock mechanism with the vehicle in a leaned state.

Referring to FIGS. 7 to 9, the operation of the tilt lock mechanism 8 in the waiting state will be described. FIGS. 7 and 8 are partial rear views of the vehicle 1 with the body cover 22 and the front fenders 223 removed, which shows the tilt lock mechanism 8 of the vehicle 1.

As shown in FIG. 7, when the vehicle 1 stands in the upright state, the second cross member 52 of the link mechanism 5 is oriented horizontally or substantially horizontally relative to the headpipe 211 (a line A-A is horizontal or substantially horizontal which connects the support portion F, the connecting portion G, and the connecting portion H of the second cross member 52 together). The stop element 81 of tilt lock mechanism 8 is inserted through the guide hole 83*d* in such a posture that the stop element 81 is supported at the support portion J at a first end portion and is suspended downwards by its own weight at the second end portion thereof. In addition, the stop element 81 is in a position where the stop element 81 is held by the lock caliper 82 to be restrained from moving.

In contrast to this, as shown in FIG. 8, when the vehicle 1 is leaned to the right, the second cross member 52 of the link mechanism 5 turns about the support portion F in such a manner that the connecting portion G rises (a line A'-A' which connects the connecting portion G with the connecting portion H via the support portion F of the second cross member 52 is inclined). As this occurs, the support portion J moves upwards to approach the headpipe 211 as the second cross member 52 turns. In the stop element 81 of the tilt lock mechanism 8, the first end portion moves upwards to approach the headpipe 211 as the support portion J moves. Then, since the stop element 81 is turnable relative to the support portion J, the stop element 81 turns relative to the support portion J while a portion thereof which remains in the guide hole 83*d* is kept restrained from moving towards the headpipe 211 by the guide member 83. A change in posture of the stop element 81 which is caused when the stop element 81 turns is smaller than a change in posture of the second cross member 52. In addition, when it stands in the upright state, the stop element 81 is positioned where the stop element 81 is held by the lock caliper 82 in such a manner that its movement is suppressed.

Figure 9A:
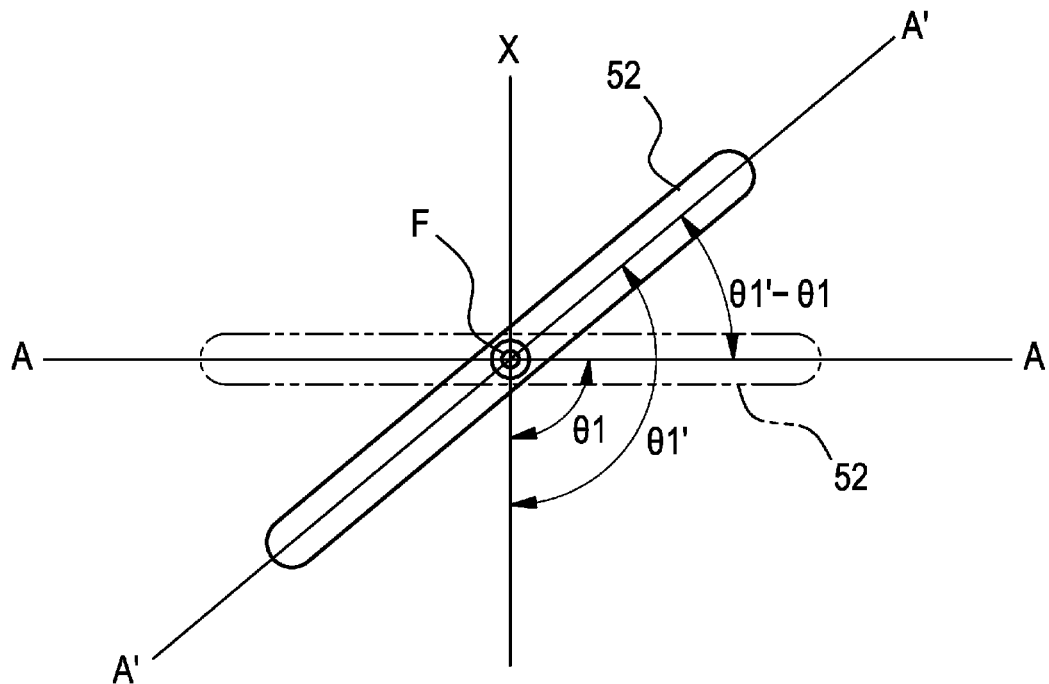
Figure 9B:
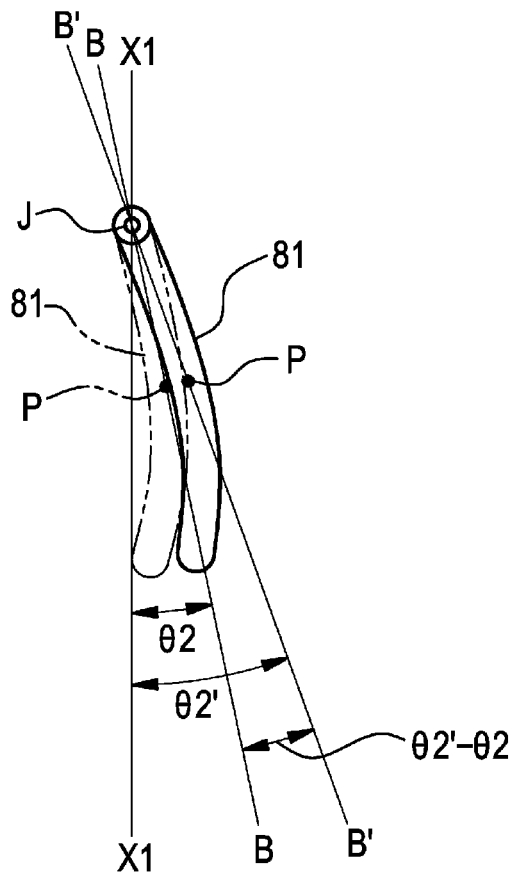

The changes in posture of the second cross member 52 and the stop element 81 (for example, the changes in angle thereof relative to the headpipe 211) will be compared with each other. FIGS. 9A and 9B show schematically changes in the angle of the second cross member 52 and the stop element 81 relative to the headpipe 211 when in the upright state and in the leaned state. A change in angle of the second cross member 52 is shown in FIG. 9A, and a change in angle of the stop element 81 is shown in FIG. 9B. The orientation of the headpipe 211 is shown as a straight line x and a straight line X1 which are parallel or substantially parallel to a center axis of the headpipe 211. The orientation of the second cross member 52 is shown by the line A-A and the line A'-A' which connect the connecting portion G with the connecting portion H via the support portion F of the second cross section 52. The orientation of the stop element 81 is shown by a line B-B and a line B'-B' which connect the support portion J of the stop element 81 and an arbitrary point P on the stop element 81 which excludes the turning center thereof.

As shown in FIGS. 7, 9A, and 9B, when the vehicle 1 is in the upright state, the orientation (the line A-A) of the second cross member 52 is at an angle of θ1 relative to the orientation (the straight line X) of the headpipe 211, and the orientation (the line B-B) of the stop element 81 is at an angle of θ2 relative to the orientation (the straight line X1) of the headpipe 211.

In contrast to this, as shown in FIGS. 8, 9A, and 9B, when the vehicle 1 is leaned to the left, the orientation (the line A'-A') of the second cross member 52 is at θ1' relative to the orientation (the straight line X) of the headpipe 211, and the orientation (the line B'-B') of the stop element 81 is at an angle of θ2' relative to the orientation (the straight line X1) of the headpipe 211.

That is, when the posture of the vehicle 1 changes from the upright state to the leaned state, as shown in FIG. 9A, the angle of the second cross member 52 relative to the headpipe 211 changes from θ1 to θ1'. The amount of change in posture of the second cross member 52 then becomes an angle of θ1'-θ1.

In addition, as shown in FIG. 9B, the angle of the stop element 81 relative to the headpipe 211 changes θ2 to θ2'. The amount of change in posture of the stop element 81 becomes an angle of θ2'-θ2.

The turning angle θ2'-θ2 of the stop element 81 relative to the headpipe 211 is smaller than a turning angle θ1'-θ1 of the second cross member 52 relative to the headpipe 211. That is, the turning operation of the second cross member 52 about the support portion F relative to the headpipe 211 during the leaning operation of the link mechanism 5 is converted into a movement of a small turning angle as the turning operation of the stop element 81 about the support portion J relative to the headpipe 211. That is, when the link mechanism 5 is performing the leaning operation, the stop element 81 moves rectilinearly or substantially rectilinearly compared with the turning operation of the second cross member 52.

Additionally, the movement of the stop element 81 in the left-and-right direction is prevented within the guide hole 83*d* by the guide member 83, and therefore, in relation to the amount of movement of the stop element 81 relative to the guide member 83 when the link mechanism 5 is performing the leaning operation, an amount of movement in the up-and-down direction is larger than an amount of horizontal movement.

In this manner, the vehicle 1 according to the present preferred embodiment includes a resisting force change mechanism which includes the stop element 81, the lock caliper 82, and the guide member 83. The stop element 81 is supported at the support portion J of the lower cross member 52 at the first end portion, such that the stop element 81 turns about a support axis of the support portion J. The lock caliper 82 is supported on the mounting plate 84 which is provided on the down frame 212 which is displaced relative to the support portion J and changes the frictional force with the stop element 81. The guide member 83 guides the second end portion of the stop element 81 to the lock caliper 82. The link mechanism 5 operates when the resisting force exerted by the resisting force change mechanism is zero or small. When the resisting force exerted by the resisting force change mechanism is large, the operation of the link mechanism 5 is suppressed or stopped. Since the vehicle 1 makes use of the stop element 81 and the lock caliper 82 which change the frictional force by using mechanical contact, it is easy to make the frictional force zero or very small. Because of this, the resisting force change mechanism makes the link mechanism 5 operate smoothly when the resisting force exerted by the resisting force change mechanism is zero or small.

Further, the turning angle of the stop element 81 relative to the support portion J resulting from the turning operation of the first cross member 51 and the second cross member 52 relative to the body frame 21 are smaller than the turning angle of the first cross member 51 or the turning angle of the second cross member 52 relative to the body frame 21 resulting from the turning operation. This configuration prevents the enlargement of the movable range of the resisting force change mechanism due to the turning operation of the first cross member 51 and the second cross member 52 relative to the body frame 21.

Thus, it is possible to prevent enlargement of the peripheral construction of the steering shaft 60 which is above the two front wheels 3 while ensuring the smooth operation of the link mechanism 5 even though the function is provided which suppresses the operation of the link mechanism 5 which is provided in the vehicle 1 equipped with the leanable body frame 21 and the two front wheels.

In addition, according to the vehicle 1 of the present preferred embodiment, when the link mechanism 5 is performing the leaning operation, the stop element 81 turns relative to the second cross member 52 and is guided to the position where the stop element 81 is brought into contact with the lock caliper 82 by the guide member 83. As this occurs, in the turning operation of the stop element 81, the turning angle of the stop element 81 relative to the headpipe 211 is smaller than the turning angle of the second cross member 52. That is, the turning operation of the second cross member 52 during the leaning operation of the link mechanism 5 is converted into the movement of the small turning angle in the stop element 81. Because of this, compared with the turning operation of the second cross member 52, the stop element 81 moves rectilinearly or substantially rectilinearly, and this reduces the operation range of the stop element 81 around the periphery of the steering shaft 60. In this manner, according to the configuration of the vehicle 1 of the present preferred embodiment, it is possible to prevent enlargement of the peripheral construction of the steering shaft 60 which is above the two front wheels 3 while providing the function to suppress the operation of the link mechanism 5. In addition, according to the configuration described above, the operation range of the stop element 81 when the link mechanism 5 performs the leaning operation is changed from the circular turning operation range of the brake disc which is integral with the cross member in the conventional resisting force change mechanism. Consequently, it is possible to enhance the degree of freedom in designing the arrangement of on-board components at the front portion of the vehicle.

Additionally, according to the vehicle 1 of the present preferred embodiment, further, the operational range of the stop element 81 preferably is set based on where to dispose the guide member 83. Consequently, at the front portion of the vehicle 1, it is possible to set the operational range of the stop element 81 in the space where on-board components such as other accessories or the like are not disposed or in the position which excludes the space for the operational range of the link mechanism 5. Because of this, it is possible to enhance the degree of freedom in designing the arrangement of on-board components at the front portion of the vehicle by effectively using the limited space at the front portion of the vehicle. For example, as in the present preferred embodiment, by disposing the stop element 81 directly behind the body frame 21 in the front-and-rear direction of the vehicle, the space defined directly in front of the body frame 21 is effectively used as the space where the on-board components are disposed.

In addition, according to the vehicle 1 of the present preferred embodiment, the stop element 81 is attached turnably to the second cross member 52 of the link mechanism 5 and is guided to the position where the stop element 81 is brought into contact with the lock caliper 82 by the guide member 83. Because of this, compared with, for example, the construction of a lock mechanism which uses a cylinder which is fixed to a vehicle body at both ends thereof, the operational range of the stop element 81 is set freely. Because of this, it is possible to enhance the degree of freedom in designing the arrangement of on-board components at the front portion of the vehicle by effectively using the limited space at the front portion of the vehicle.

In addition, in the body configuration including the lock mechanism utilizing the cylinder, when the vehicle is cornering with the link mechanism deformed to allow the two front wheels to lean, it is considered that the resistance generated when the cylinder extends or contracts interrupts the leaning operation of the link mechanism. According to the vehicle 1 of the present preferred embodiment, however, it is possible to adjust the force with which the lock pads of the lock caliper 82 hold the stop element 81 as required by operating the lever 23b. For example, it is possible to realize various states including: the frictional force between the lock pads and the stop element 81 is increased to a maximum level to stop the movement of the stop element 81 completely; the lock pads and the stop element 81 are separated from each other to make the frictional force generated between the same members nil to allow the stop element 81 to move completely freely; or a frictional force is generated between the lock pads and the stop element 81 so as to make it difficult for the stop element 81 to move by the frictional force generated although the stop element 81 slides relative to the lock pads. Consequently, for example, in a state in which the movement of the stop element 81 is not suppressed by the lock caliper 82, the resistance exerted against the turning movement of the second cross member 52 by the stop element 81 is set as small as possible, so as not to interrupt the leaning operation of the link mechanism.

Additionally, according to the vehicle 1 of the present preferred embodiment, the position and size of the guide member 83 should be set so that the stop element 81 is positioned within the range where the lock caliper 82 suppresses the movement of the stop element 81 by contact of the guide member 83 with a portion of the stop element 81. Consequently, compared with the body configuration including the lock mechanism which utilizes the cylinder, the guide member 83 is reduced in size.

In addition, in the vehicle 1 according to the present preferred embodiment, the support portion J is provided on the second cross member 52, and the support portion J is spaced in a radial direction by a distance R away from a turning axis (an example of a lower axis) of the second cross member 52. By ensuring a distance from the support portion F to the support portion J on the second cross member 52, the force with which the movement of the stop element 81 is suppressed to suppress the turning of the second cross member 52 is made small enough such that the distance is ensured. That is, even though the force with which the lock caliper 82 holds the stop element 81 is not strong, the turning of the second cross member 52 or the leaning operation of the link mechanism 5 is suppressed in an ensured fashion. Consequently, it is possible to achieve a reduction in the size of the lock caliper 82. Additionally, the inexpensive lock caliper 82 is capable of being used.

In addition, in the vehicle 1 according to the present preferred embodiment, a movable range in the up-and-down direction of the stop element 81 based on the turning operation of the first cross member 51 and the second cross member 52 relative to the body frame 21 is preferably larger than a movable range in the horizontal direction of the stop element 81 based on the turning operation of the first cross member 51 and the second cross member 52 relative to the body frame 21.

According to this configuration, in relation to the operation of the stop element 81 associated with the leaning operation of the vehicle, the amount of movement in the up-and-down direction relative to the guide member 83 is larger than the amount of horizontal movement. In this manner, in the movable range of the stop element 81 based on the turning operation of the first cross member 51 and the second cross member 52 relative to the body frame 21, the movable range in the up-and-down direction is larger than the horizontal movable range. Because of this, the stop element 81 moves in the up-and-down direction. Thus, the narrow space in the up-and-down direction in the vicinity of the steering shaft 60 is effectively used as the operation space of the stop element 81. In addition, it is possible to prevent enlargement of the peripheral construction of the steering shaft 60.

In the vehicle 1 according to the present preferred embodiment, since the lock caliper 82 is disposed to the side of the down frame 212 in the front view of the vehicle, the space defined to the side of the down frame 212 at the front portion of the vehicle is effectively used. Consequently, compared with the case where the lock mechanism 8 is disposed directly in front of the link mechanism 5, the space is secured for installation of on-board components such as accessories or the like which are desired to be disposed directly in front of the link mechanism 5, thus making it possible to enhance the degree of freedom in designing the arrangement of accessories at the front portion of the vehicle.

Additionally, in the vehicle of the present preferred embodiment, the lock caliper 82 is preferably disposed below the second cross member 52.

According to this configuration, since the lock caliper 82 which tends to increase its weight is disposed below the second cross member 52, it is possible to lower the center of gravity of the vehicle body to a lower level than when the lock caliper 82 is disposed above the first cross member 51. In addition, it is possible to prevent enlargement of the peripheral construction of the steering shaft 60.

In addition, the link mechanism 5 includes a plurality of turning motions between the individual constituent members. Because of this, a displacement in the turning direction is included in the displacement between the position where the support portion J where the first end portion of the stop element 81 is supported turnably and the position of the mounting plate where the lock caliper 82 which suppresses the movement of the stop element 81. However, the movable range of the stop element 81 is reduced more by making the stop element 81 in a curved shape.

Thus, while the present invention has been described in detail and by reference to specific preferred embodiments, various alterations or modifications can be made thereto without departing from the spirit and scope of the present invention.

For example, in the preferred embodiments described above, the first end portion of the stop element 81 is described as preferably being attached to the second cross member via the attachment arm 85 so as to turn about the support portion J, and the lock caliper 82 and the guide member 83 are described as being attached to the mounting plate 84 which is provided on the down frame 82. However, the present invention is not limited to this configuration. The movement of the stop element 81 when the link mechanism 5 performs the leaning operation can be set as required within the range where the stop element 81 can move substantially rectilinearly compared with the turning operation of the first cross member 51 and the second cross member 52.

For example, the position where the stop element 81 is supported (the position of the support portion J) is not limited to the second cross member 52. Hence, the stop element 81 may be supported, for example, on the first side member 53. In addition, in a preferred embodiment, while the stop element 81 is disposed directly to the right of the headpipe 211, the stop element 81 may be disposed directly to the left of the headpipe 211.

Figure 10:
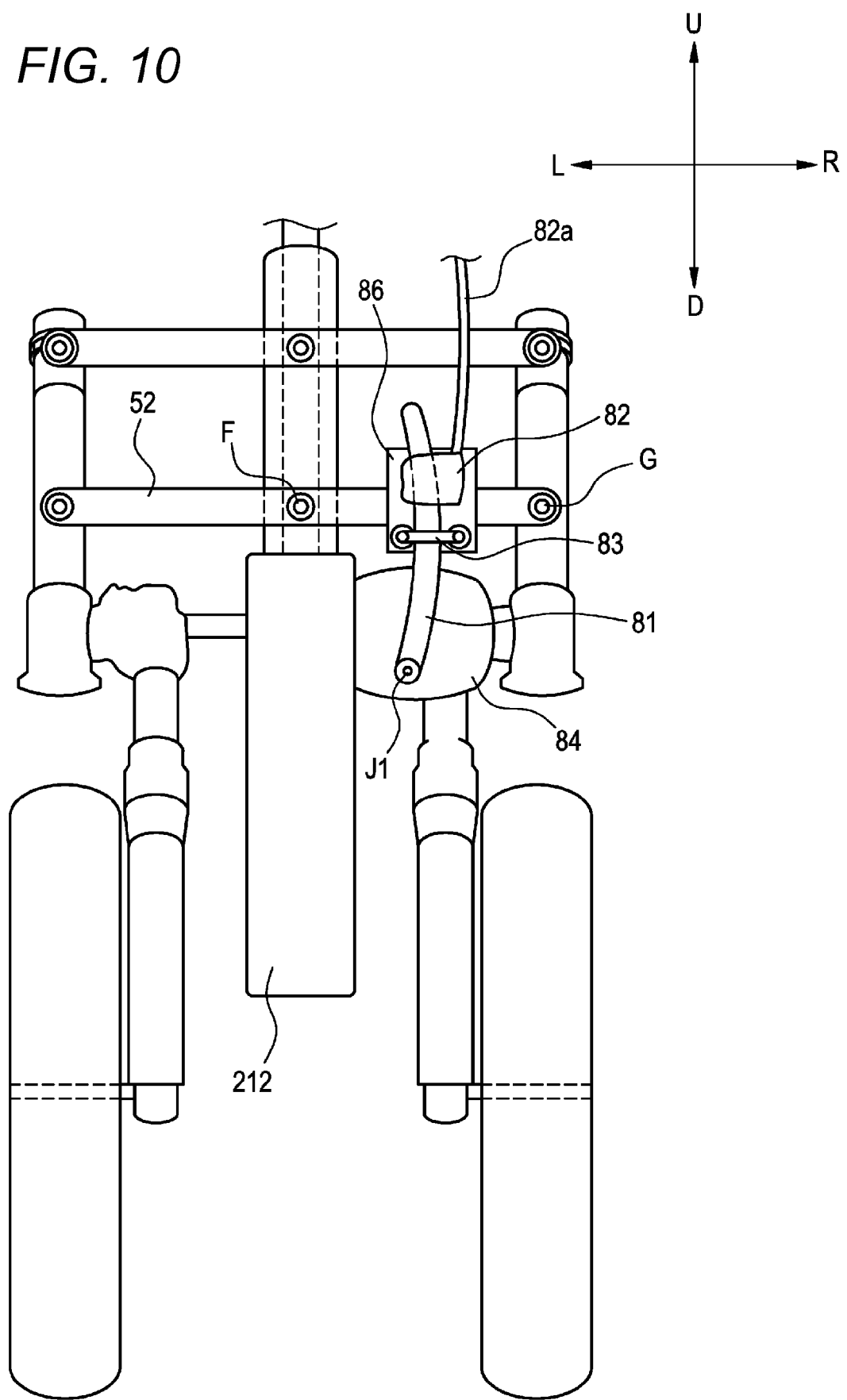
FIG. 10 is a partial rear view of the vehicle with a modified tilt lock mechanism according to a first modified example of a preferred embodiment of the present invention.

FIG. 10 shows a first modified example of the tilt lock mechanism 8. In this first modified example, a lower end portion of a stop element 81 is attached to the mounting plate 84 which is provided on the down frame 212 so as to turn about a support portion J1 thereon. Additionally, a mounting plate 86 is attached to the second cross member 52, and the lock caliper 82 and the guide member 83 are placed on this mounting plate 86. Also, according to the configuration of the first modified example, when the link mechanism 5 performs the leaning operation, the stop element 81 moves rectilinearly or substantially rectilinearly compared with the turning operation of the first cross member 51 or the second cross member 52, and the same working effect as that provided by the preferred embodiments described is achieved. In this configuration, when the link mechanism 5 operates, the stop element 81 is translated while turning relative to the link mechanism 5. In this manner, the description that the "stop element 81 is provided so as to turn relative to the link mechanism" includes not only the configuration in which the stop element 81 only turns but also the configuration in which the stop element 81 moves in other ways in addition to the turning operation.

Figure 11:
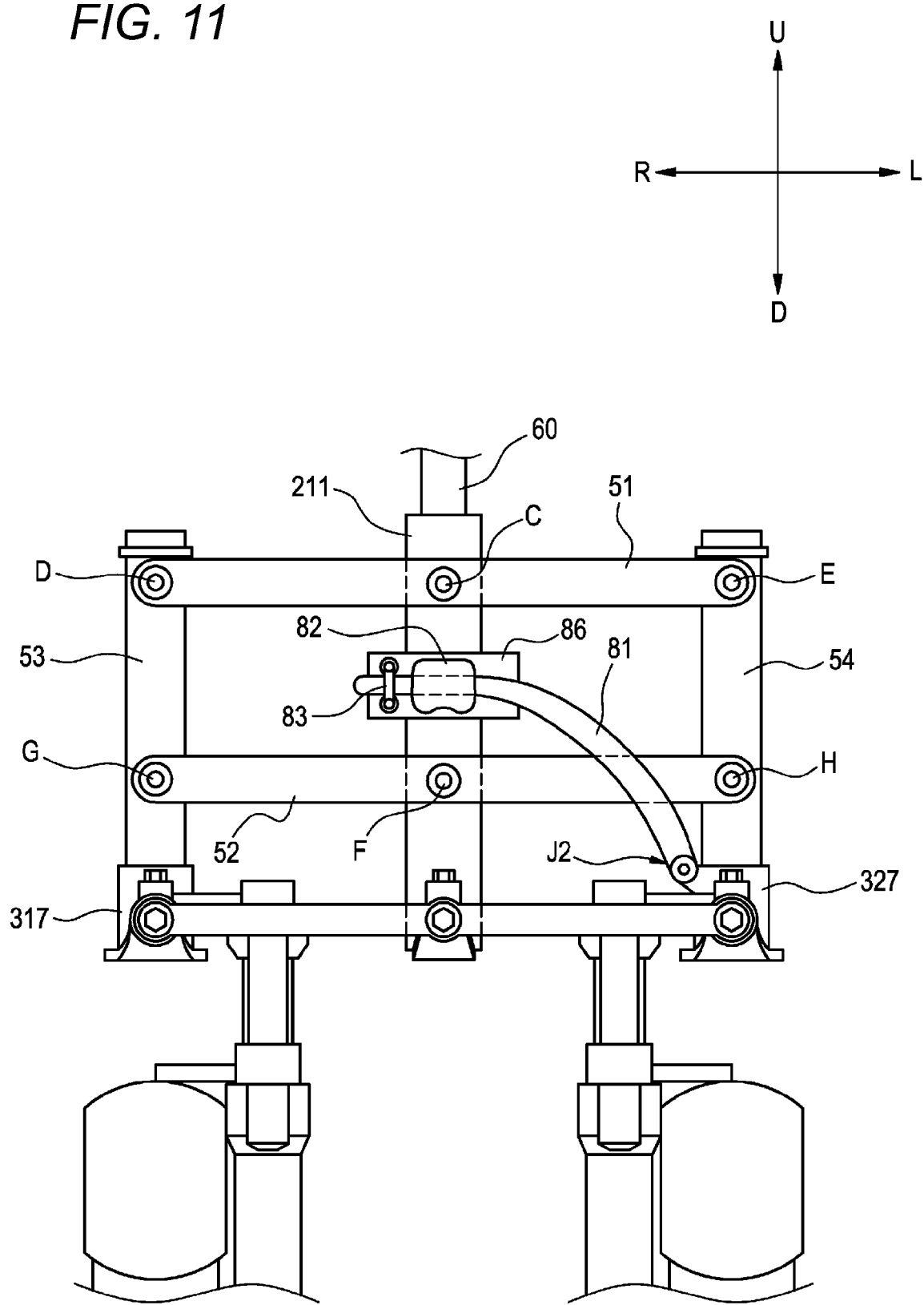
FIG. 11 is a front partial enlarged view of the vehicle with the body cover and the front fenders removed, which depicts a second modified example of a preferred embodiment of the present invention.

FIG. 11 shows a second modified example of the tilt lock mechanism. FIG. 11 is a front partially enlarged view of the vehicle in a state in which the body cover is removed. As shown in FIG. 11, in a tilt lock mechanism according to the second modified example, a left end portion of a stop element 81 is attached turnably to a support portion J2 which is provided at a right end portion of the second bracket 327. In addition, a mounting plate 86 is attached to a portion of the headpipe 211 which lies between the connecting point C and the connecting point F, and the lock caliper 82 and the guide member 83 are placed on this mounting plate 86. In this second modified example, the support portion J2 is disposed below the second cross member 52. Additionally, the support portion J2 is provided on a portion of the second bracket 327 which is an example of a member which turns together with the steering shaft 60 during steering and which is located in a position near the turning axis of the second side member 54. Also, according to the configuration of the second modified example, when the link mechanism 5 performs the leaning operation, the stop element 81 moves rectilinearly or substantially rectilinearly compared with the turning operation of the first cross member 51 or the second cross member 52, and therefore, the same working effect as that provided by the preferred embodiments described above is provided.

Figure 12:
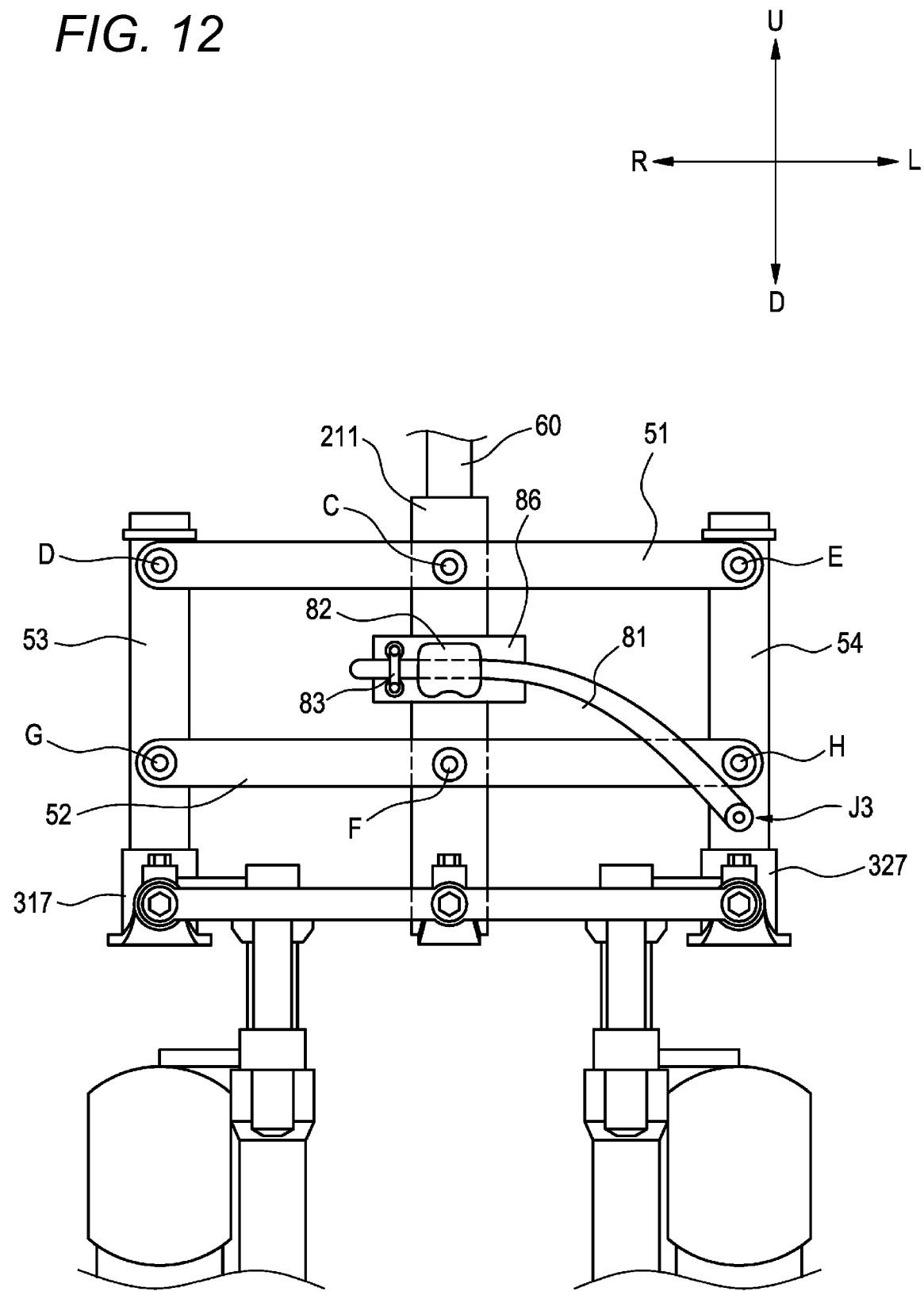
FIG. 12 is a front partial enlarged view of the vehicle with the body cover and the front fenders removed, which depicts a third modified example of a preferred embodiment of the present invention.

FIG. 12 shows a third modified example of the tilt lock mechanism. FIG. 12 is a front partial enlarged view of the vehicle with the body cover and the front fenders removed. As shown in FIG. 12, in a tilt lock mechanism according to the third modified example, a left end portion of a stop element 81 is attached turnably to a support portion J3 which is provided at a lower portion (located below the connecting portion H) of the second side member 54. In addition, a mounting plate 86 is attached to a portion of the headpipe 211 which is located between the connecting point C and the connecting point F, and the lock caliper 82 and the guide member 83 are placed on this mounting plate 86. In this third modified example, the support portion J3 is disposed below the second cross member 52. Additionally, the support portion J3 is provided in a position where the support portion J3 is superposed on the link mechanism 5 (in this modified example, the second side member 54) at all times in the front view of the vehicle, when the link mechanism 5 performs the leaning operation. Also, according to the configuration of the third modified example, when the link mechanism 5 performs the leaning operation, the stop element 81 moves rectilinearly or substantially rectilinearly compared with the turning operation of the first cross member 51 or the second cross member 52, and therefore, the same working effect as that provided by the preferred embodiments described above is provided.

Figure 13:
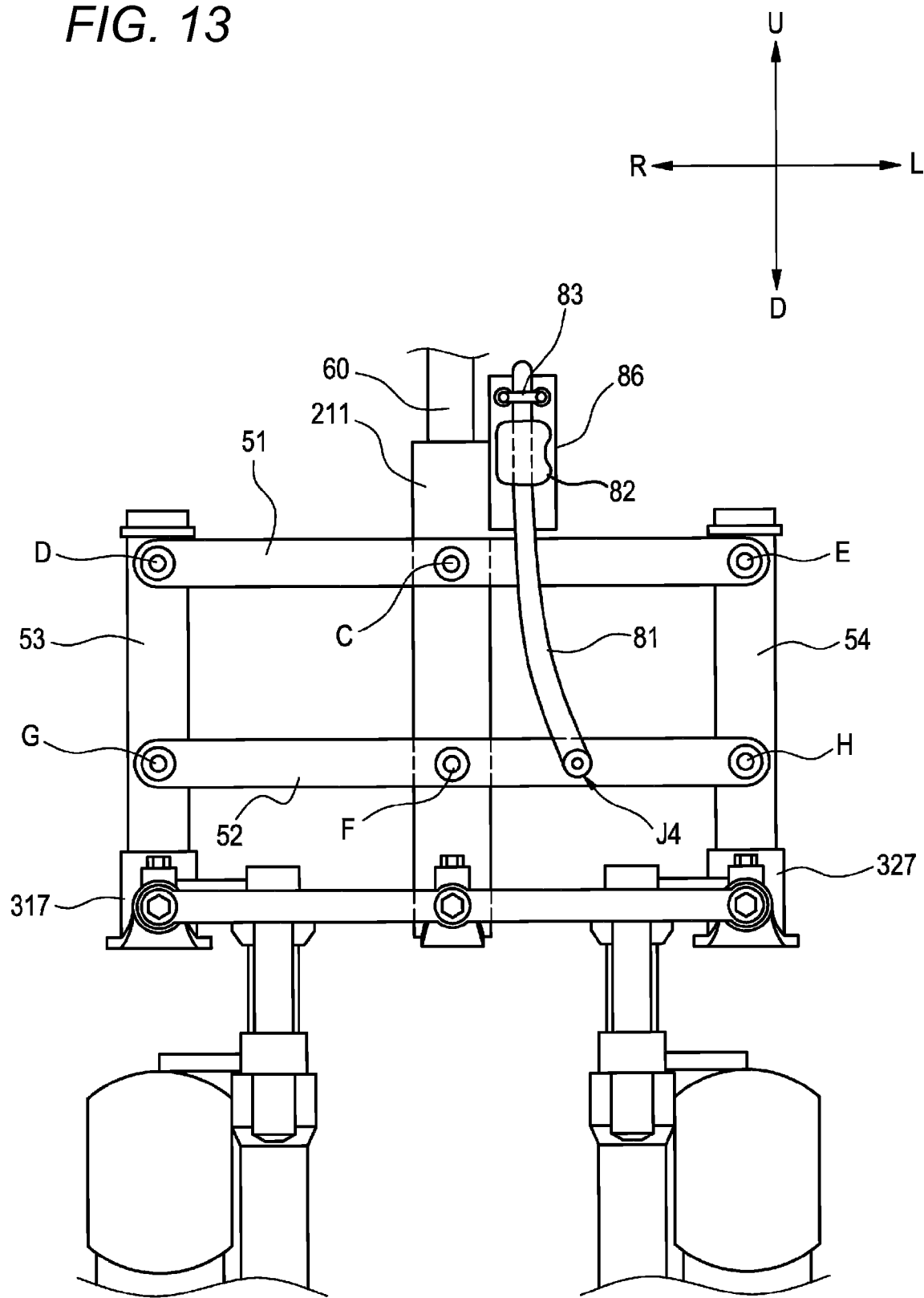
FIG. 13 is a front partial enlarged view of the vehicle with the body cover and the front fenders removed, which depicts a fourth modified example of a preferred embodiment of the present invention.

FIG. 13 shows a fourth modified example of the tilt lock mechanism. FIG. 13 is a front partial enlarged view of the vehicle with the body cover and the front fenders removed. As shown in FIG. 13, in a tilt lock mechanism according to the fourth modified example, a lower end portion of a stop element 81 is attached turnably to a support portion J4 which is provided at a left portion (located between the connecting portion H and the connecting portion F) of the second cross member 52. In addition, a mounting plate 86 is attached to a portion located to the left of an upper portion (located above the connecting point C) of the headpipe 211, and the lock caliper 82 and the guide member 83 are placed on this mounting plate 86. In this fourth modified example, the support portion J4 is disposed above the first cross member 51. Also, according to the configuration of the fourth modified example, when the link mechanism 5 performs the leaning operation, the stop element 81 moves rectilinearly or substantially rectilinearly compared with the turning operation of the first cross member 51 or the second cross member 52, and therefore, the same working effect as that provided by the preferred embodiments described above is provided.

Figure 14:
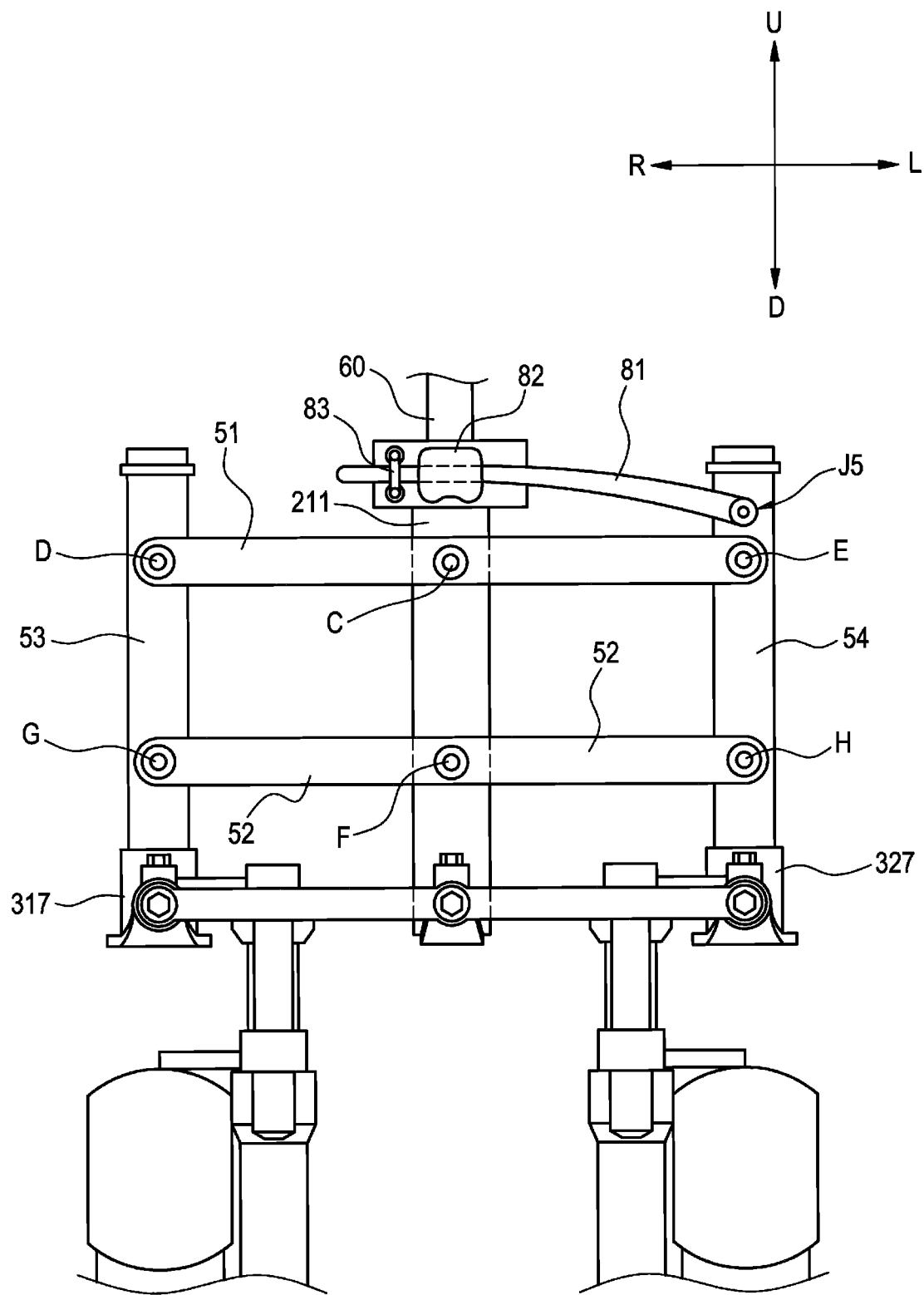
FIG. 14 is a front partial enlarged view of the vehicle with the body cover and the front fenders removed, which depicts a fifth modified example of a preferred embodiment of the present invention.

FIG. 14 shows a fifth modified example of the tilt lock mechanism. FIG. 14 is a front partial enlarged view of the vehicle with the body cover and the front fenders removed. As shown in FIG. 14, in a tilt lock mechanism according to the fifth modified example, a left end portion of a stop element 81 is attached turnably to a support portion J5 which is provided at an upper portion (located above the connecting portion E) of the second side member 54. In addition, a mounting plate 86 is attached to an upper portion (located above the connecting point C) of the headpipe 211, and the lock caliper 82 and the guide member 83 are placed on this mounting plate 86. In this fifth modified example, the support portion J5 is disposed above the first cross member 51. Also, according to the configuration of the fifth modified example, when the link mechanism 5 performs the leaning operation, the stop element 81 moves rectilinearly or substantially rectilinearly compared with the turning operation of the first cross member 51 or the second cross member 52, and therefore, the same working effect as that provided by the preferred embodiments described above is provided.

Figure 15:
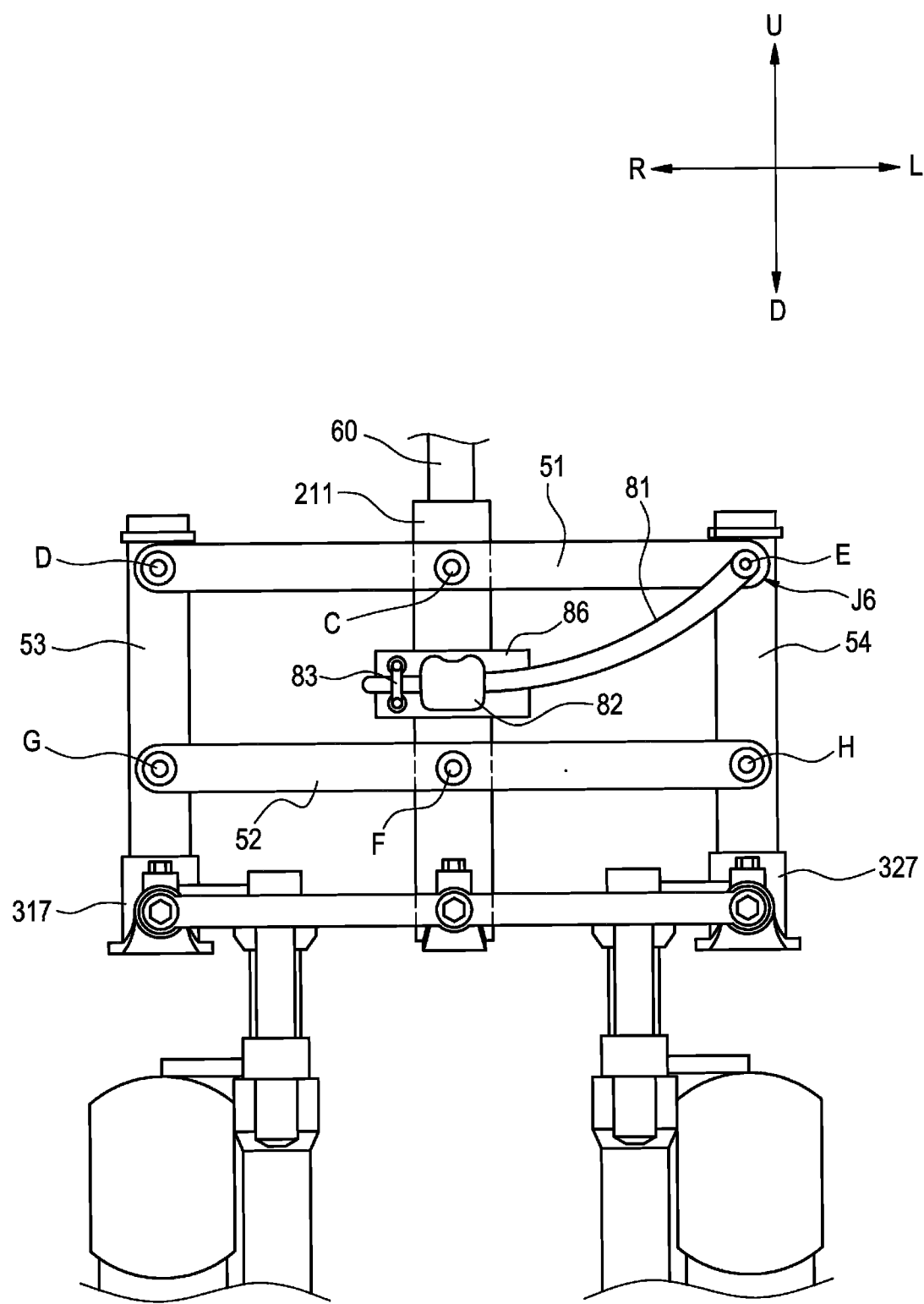
FIG. 15 is a front partial enlarged view of the vehicle with the body cover and the front fenders removed, which depicts a sixth modified example of a preferred embodiment of the present invention.

FIG. 15 shows a sixth modified example of the tilt lock mechanism. FIG. 15 is a front partial enlarged view of the vehicle with the body cover and the front fenders removed. As shown in FIG. 15, in a tilt lock mechanism according to the sixth modified example, a left end portion of a stop element 81 is attached turnably to the connecting portion E of the second side member 54. In this modified example, the connecting portion E also defines a support portion J6 which turnably supports the left end portion of the stop element 81. In addition, a mounting plate 86 is attached to a portion of the headpipe 211 which is located between the connecting point C and the connecting point F, and the lock caliper 82 and the guide member 83 are placed on this mounting plate 86. Additionally, in this sixth modified example, the support portion J6 is arranged in a position where the support portion J6 is superposed on the link mechanism 5 (in this modified example, the first cross member 51) at all times in the front view of the vehicle, when the link mechanism 5 performs the leaning operation. Also, according to the configuration of the sixth modified example, when the link mechanism 5 performs the leaning operation, the stop element 81 moves rectilinearly or substantially rectilinearly compared with the turning operation of the first cross member 51 or the second cross member 52, and therefore, the same working effect as that provided by the preferred embodiments described above is provided.

In the sixth modified example, a configuration is used in which the relative positional relationship between the first cross member 51 and the headpipe 211 is prevented from changing by the stop element 81 and the lock caliper 82. However, the present invention is not limited to the sixth modified example. For example, a configuration may be used in which the relative positional relationship between the members which make up the link mechanism 5 is prevented from changing. For example, a configuration may be used in which the relative positional relationship between the first cross member 51 and the first side member 53 is prevented from changing by the stop element 81 and the lock caliper 82. Alternatively, a configuration may be used in which the relative positional relationship between the first cross member 51 and the second side member 54 is prevented from changing. Similarly, a configuration may be used in which the relative positional relationship between the second cross member 52 and the first side member 53 is prevented from changing by the stop element 81 and the lock caliper 82. Alternatively, a configuration may be used in which the relative positional relationship between the second cross member 52 and the second side member 54 is prevented from changing. In addition, a configuration may be used in which the relative positional relationship between the first cross member 51 and the second cross member 52 is prevented from changing by the stop element 81 and the lock caliper 82. For example, a configuration may be used in which the stop element 81 is attached turnably to the connecting portion C of the first cross member 51 as a support portion, the lock caliper 82 is provided on the second cross member 52, and the relative positional relationship between the first cross member 51 and the second cross member 52 is prevented from changing. Similarly, a configuration may be used in which the stop element 81 is attached turnably to the connecting portion F of the second cross member 52 as a support portion, the lock caliper 82 is provided on the first cross member 51, and the relative positional relationship between the first cross member 51 and the second cross member 52 is prevented from changing.

Thus, as has been described by reference to the first through sixth modified examples, the position where to provide the support portion which is the portion where the first end portion of the stop element 81 is supported turnably and the position where to provide the lock caliper 82 and the guide member 83 which suppress the movement of the stop element 81 are set as required within the range where the stop element 81 moves rectilinearly or substantially rectilinearly compared with the turning operation of the first cross member 51 or the second cross member 52 when the link mechanism 5 performs the leaning operation.

For example, in the first or fourth modified example, one of the stop element 81 and the lock caliper 82 is supported on one of the first cross member 51 and the second cross member 52. The space between the first end portion and the second end portion of the stop element 81 in the up-and-down direction of the body frame 21 is longer than the space between the first end portion and the second end portion of the stop element 81 in the left-and-right direction of the body frame 21 when the body frame 21 is in the upright state. According to this configuration, the first cross member 51 and the second cross member 52 turn relative to the body frame 21, the first side member 53, the second side member 54, the right shock absorbing device, and the left shock absorbing device. As this occurs, the stop element 81 moves along the longitudinal direction of the stop element 81 in association with the turning of the first cross member 51 or the second cross member 52. This makes the movable range of the stop element 81 small. Consequently, enlargement of the peripheral structure of the steering shaft which is above the two front wheels 3 is further prevented while ensuring the smooth operation of the link mechanism 5.

In addition, for example, in the first through third, fifth, and sixth modified examples, one of the stop element 81 and the lock caliper 82 is supported on any one of the body frame 21, the first side member 53, and the second cross member 54. The space between the first end portion and the second end portion of the stop element 81 in the left-and-right direction of the body frame 21 is longer than the space between the first end portion and the second end portion of the stop element 81 in the up-and-down direction of the body frame 21 when the body frame 21 is in the upright state. According to this configuration, the stop element 81 is as long in the left-and-right direction of the body frame 21 as the first cross member 51 and the second cross member 52. Moreover, the stop element 81 turns relative to the body frame 21, the first side member 53 and the second side member 54 as the first cross member 51, and the second cross member 52 do. Accordingly, even though the stop element 81 is disposed in the vicinity of the first cross member 51 or the second cross member 52, the stop element 81 tends to easily avoid interference with the first cross member 51 or the second cross member 52. This enables the movable range of the stop element 81 and the movable range of the first cross member 51 or the second cross member 52 to approach each other or to be superposed one on the other in the front view of the vehicle. Consequently, enlargement of the peripheral structure of the steering shaft which is above the two front wheels 3 is further prevented while ensuring the smooth operation of the link mechanism 5.

In addition, for example, in the preferred embodiments described above, while the first cross member 51 and the second cross member 52 each preferably include the pair of front and rear plate-shaped members which extend in the left-and-right direction, the first cross member 51 and the second cross member 52 may each be a member which is made up of a member which extends to the right from the headpipe 211 and a member which extends to the left from the headpipe 211. Additionally, the shapes of the members which make up the link mechanism 5 do not have to be rectilinear and hence can be changed as required.

In addition, the shape of the stop element 81 is not limited to the curved plate-shaped member. The stop element 81 is preferably an extended member which moves in the direction of the guide member 83 as the second cross member 52 turns and is shaped so as to be held by the lock caliper 82.

The tilt lock mechanism in the first preferred embodiment described above is not intended only to stop completely the leaning operation of the vehicle by the link mechanism. For example, the tilt lock mechanism allows for the state in which the leaning operation of the vehicle by the link mechanism is made difficult to be executed smoothly by virtue of the frictional force.

Second Preferred Embodiment

Referring to FIGS. 16 to 21, a three-wheeled vehicle 2001 according to a second preferred embodiment of the present invention will be described. Like reference numerals will be given to like or corresponding elements and the similar description thereof will not be repeated. Hereinafter, in the figures, an arrow F denotes a frontward direction of the three-wheeled vehicle 2001. In the figures, an arrow R denotes the right of the three-wheeled vehicle 2001. In the figures, an arrow L denotes the left of the three-wheeled vehicle 2001. An arrow U denotes a vertically upward direction. A transversely outward direction indicates a direction directed to the left or right from a transverse center.

Figure 16:
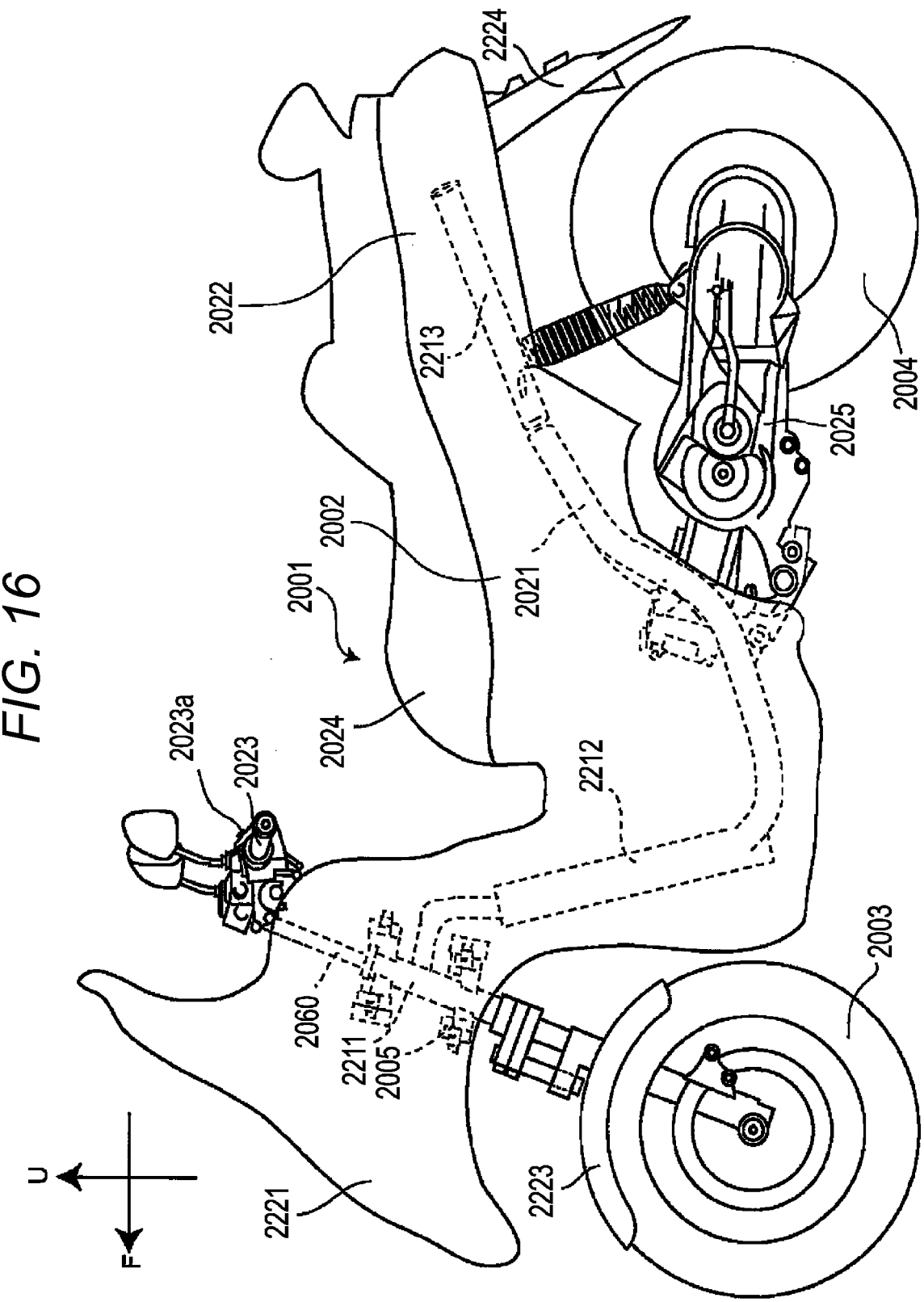
FIG. 16 is an overall left side view of a vehicle according to a second preferred embodiment of the present invention.

FIG. 16 is an overall side view showing the three-wheeled vehicle 2001. In the following description, when front, rear, left, and right are referred to, they denote front, rear, left and right as seen from a rider on the three-wheeled vehicle 2001.

The three-wheeled vehicle 2001 includes a vehicle main body 2002, front wheels 2003, and a rear wheel 2004. The vehicle main body 2002 includes a body frame 2021, a body cover 2022, a handlebar 2023, a seat 2024, and a power unit 2025.

The body frame 2021 supports the power unit 2025, the seat 2024, and the like. The power unit 2025 includes an engine, a transmission, and the like. In FIG. 16, the body frame 2021 is shown by a broken line.

The body frame 2021 includes a headpipe 2211, a down frame 2212, and a rear frame 2213. The headpipe 2211 is disposed directly in front of the vehicle. A link mechanism 2005 is disposed on the periphery of the head pipe 2111. A steering shaft 2060 is turnably inserted into the headpipe 2211. The steering shaft 2060 extends in the up-and-down direction. The handlebar 2023 is attached to an upper end portion of the steering shaft 2060. The down frame 2212 is slanted downward from a front end towards the rear. The rear frame 2213 supports the seat 2024, a tail lamp, and the like. A switch 2023a is attached to the handlebar 2023.

The body frame 2021 is covered with the body cover 2022. The body cover 2022 includes a front cover 2221, front fenders 2223, and a rear fender 2224.

The front cover 2221 is positioned directly in front of the seat 2024. The front cover 2221 covers the headpipe 2211 and the link mechanism 2005.

The front fenders 2223 are disposed individually directly above the pair of left and right front wheels 2003. The front fenders 2223 are disposed directly below the front cover 2221. The rear fender 2224 is disposed directly above the rear wheel 2004.

The front wheels 2003 are disposed below the headpipe 2211 and the link mechanism 2005. The front wheels 2003 are disposed directly below the front cover 2221. The rear wheel 2004 is disposed directly below the body cover 2022.

Figure 17:
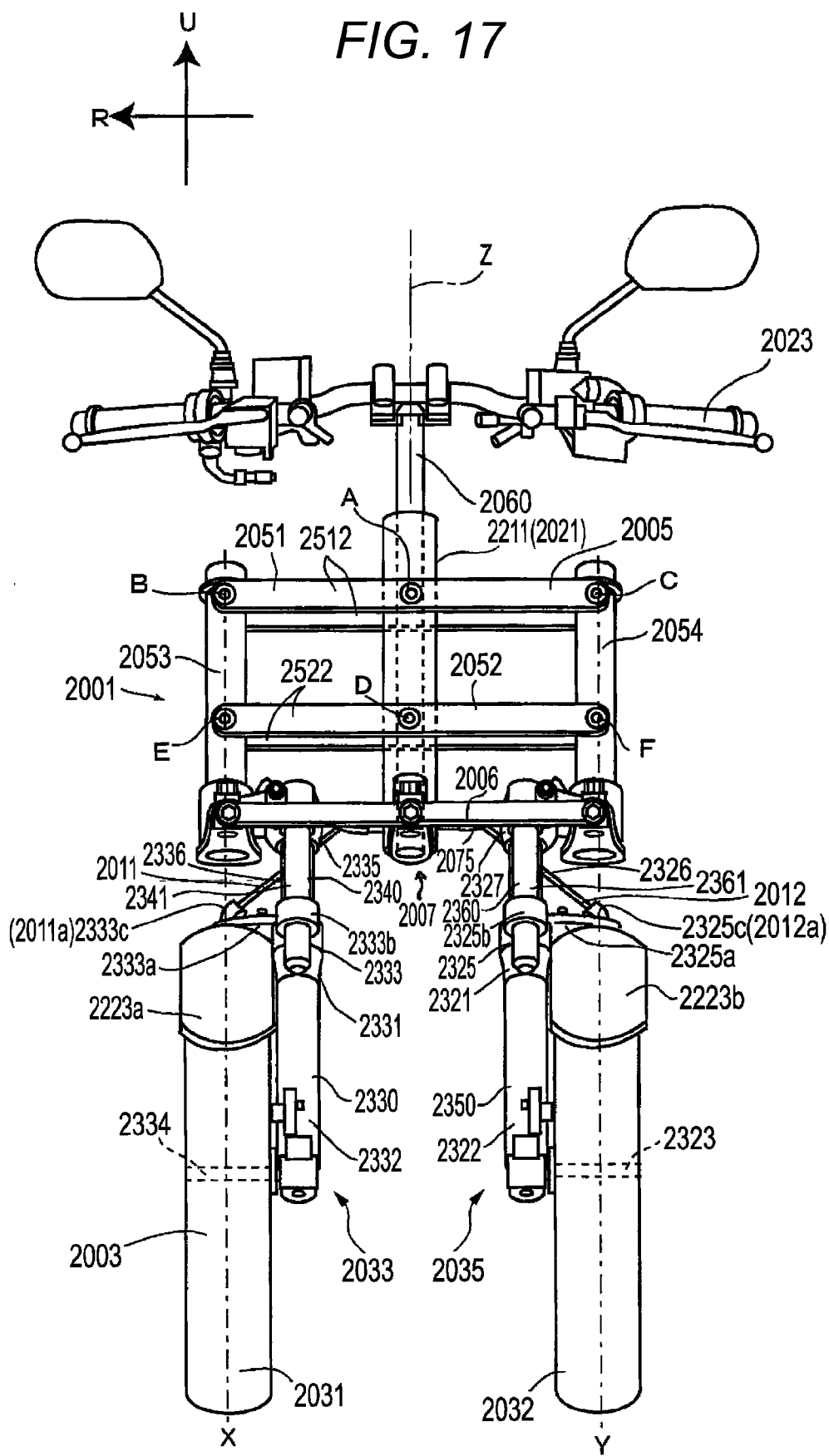
FIG. 17 is an overall front view showing the vehicle with a body cover removed.

FIG. 17 is an overall front view showing the three-wheeled vehicle 2001 with the body cover 2022 removed. In FIG. 17, the down frame 2212 and the like are omitted.

The three-wheeled vehicle 2001 includes the handlebar 2023, the steering shaft 2060, the headpipe 2211, the pair of left and right front wheels 2003, a first shock absorbing device 2033, a first turning preventing mechanism 2340, a second shock absorbing device 2035, a second turning preventing mechanism 2360, the link mechanism 2005, an operation force transfer mechanism 2006, and a deformation suppressing mechanism 2007 (an example of a resisting force change mechanism).

The front wheels 2003 include a first front wheel 2031 and a second front wheel 2032 which are disposed side by side in a left-and-right direction of the body frame 2021. The first front wheel 2031, which is an example of a right front wheel, is disposed to the right in relation to a transverse center. A first front fender 2223a is disposed directly above the first front wheel 2031. The second front wheel 2032, which is an example of a left front wheel, is disposed to the left in relation to the transverse center. A second front fender 2223b is disposed directly above the second front wheel 2032. The second front wheel 2032 is disposed so as to be symmetric with the first front wheel 2031 with respect to the body frame 2021 in the left-and-right direction. In this description, the "left-and-right direction of the body frame 2021" denotes a direction which is perpendicular or substantially perpendicular to an axial direction of the headpipe 2211 in the front view of the three-wheeled vehicle 2001.

The first shock absorbing device 2033, which is an example of a right shock absorbing device, supports the first front wheel 20031 at a lower portion and absorbs a displacement of the first front wheel 2031 in the up-and-down direction of the body frame 2021 with respect to the upper portion thereof. The first shock absorbing device 2033 includes a first shock absorber 2330 and the first turning preventing mechanism 2340. In this description, the "up-and-down direction of the body frame 2021" denotes a direction which follows the axial direction of the headpipe 2211 in the front view of the three-wheeled vehicle 2001.

The first shock absorber 2330 includes a first support member 2331. The first support member 2331 includes a first outer tube 2332, a first support shaft 2334, and a first inner tube 2336. A portion of the first inner tube 2336 is inserted in an inner circumferential side of the first outer tube 2332. The first inner tube 2336 is disposed directly above the first outer tube 2332. The first inner tube 2336 moves relative to the first outer tube 2332 in relation to the direction in which the first outer tube 2332 extends. The first shock absorber 2330 is preferably a so-called telescopic shock absorber, for example.

The first turning preventing mechanism 2340 prevents the relative turning of the first outer tube 2332 to the first inner tube 2336. The first turning preventing mechanism 2340 preferably has the same configuration as that of the second turning preventing mechanism 2360 that was described with reference to FIG. 3. That is, the first turning preventing mechanism 2340 includes a first guide 2333, a first turning preventing rod 2341, and a first bracket 2335. The first guide 2333 guides the first turning preventing rod 2341 in a direction in which it moves. The first guide 2333 includes a first guide tube 2333b. The first turning preventing rod 2341 is inserted in an inner circumferential side of the first guide tube 2333b. The first turning preventing rod 2341 moves relative to the first guide tube 2333b. The first turning preventing rod 2341 prevents a relative turning of the first front wheel 2031 to the first inner tube 2336. The first turning preventing rod 2341 is disposed parallel or substantially parallel to the first shock absorber 2330. Upper ends of the first turning preventing rod 2341 and the first inner tube 2336 are fixed to the first bracket 2335. This configuration prevents a relative turning of the first turning preventing rod 2341 to the first inner tube 2336.

The first front wheel 2031 is supported on the first support member 2331. The first front wheel 2031 is connected to a lower portion of the first support member 2331. The first support shaft 2334 is provided at a lower end of the first outer tube 2332 and supports the first front wheel 2031. The first guide 2333 includes a first plate 2333a. The first plate 2333a extends directly above the first front fender 2223a. The first front wheel 2031 is able to change its orientation by turning about a first center axis X. The first center axis X intersects the first plate 2333a at a first connecting point 2333c.

The second shock absorbing device 2035, which is an example of a left shock absorbing device, supports the second front wheel 2032 at a lower portion and absorbs a displacement of the second front wheel 2032 in the up-and-down direction of the body frame 2021 with respect to the upper portion thereof. The second shock absorbing device 2035 includes a second shock absorber 2350 and the second turning preventing mechanism 2360.

The second shock absorber 2350 includes a second support member 2321. The second support member 2321 includes a second outer tube 2322, a second support shaft 2323, and a second inner tube 2326. A portion of the second inner tube 2326 is inserted in an inner circumferential side of the second outer tube 2322. The second inner tube 2326 is disposed directly above the second outer tube 2322. The second inner tube 2326 moves relative to the second outer tube 2322 in the direction in which the second outer tube 2322 extends. The second shock absorber 2350 is preferably a so-called telescopic shock absorber, for example.

The second turning preventing mechanism 2360 prevents a relative turning of the second outer tube 2322 to the second inner tube 2326. The second turning preventing mechanism 2360 includes a second guide 2325, a second turning preventing rod 2361, and a second bracket 2327. The second guide 2325 guides the second turning preventing rod 2361 in a direction in which it moves. The second guide 2325 includes a second guide tube 2325b. The second turning preventing rod 2361 is inserted in an inner circumferential side of the second guide tube 2325b. The second turning preventing rod 2361 moves relative to the second guide tube 2325b. The second turning preventing rod 2361 prevents a relative turning of the second front wheel 2032 to the second inner tube 2326. The second turning preventing rod 2361 is disposed parallel or substantially parallel to the second shock absorber 2350. Upper ends of the second turning preventing rod 2361 and the second inner tube 2326 are fixed to the second bracket 2327. This configuration prevents a relative turning of the second turning preventing rod 2361 to the second inner tube 2326.

As shown in FIG. 17, the second front wheel 2032 is supported by the second support member 2321. The second front wheel 2032 is connected to a lower portion of the second support member 2321. The second support shaft 2323 is provided at a lower end of the second outer tube 2322 and supports the second front wheel 2032. The second guide 2325 includes a second plate 2325a. The second plate 2325a extends directly above the second front fender 2223b. The second front wheel 2032 is able to turn about a second center axis Y so as to change its orientation. The second center axis Y intersects the second plate 2325a at a second connection point 2325c.

The link mechanism 2005 is disposed directly below the handlebar 2023. The link mechanism 2005 is disposed directly above the first front wheel 2031 and the second front wheel 2032. The link mechanism 2005 is connected to the headpipe 2211. The link mechanism 2005 includes a first cross member 2051 (an example of an upper cross member), a second cross member 2052 (an example of a lower cross member), a first side member 2053 (an example of a right side rod), and a second side member 2054 (an example of a left side rod).

The first cross member 2051 includes a pair of plate-shaped members 2512. The first cross member 2051 extends in the left-and-right direction of the body frame 2021. The pair of plate-shaped members 2512 sandwiches the headpipe 2211 therebetween in a front-and-rear direction of the body frame 2021. In this description, the "front-and-rear direction of the body frame 2021" denotes a direction which coincides with the front-and-rear direction of the three-wheeled vehicle 2001. In this description, the description that the "first cross member 2051 or the like extends in the left-and-right direction of the body frame 2021" indicates that the first cross member 2051 or the like extends while being inclined in relation to the left-and-right direction of the body frame 2021 and additionally indicates that the first cross member 2051 or the like extends while being inclined substantially to the left-and-right direction compared with the up-and-down direction and front-and-rear direction of the body frame.

As shown in FIG. 17, a middle portion of the first cross member 2051 is supported on the body frame 2021 (the headpipe 2211) by a support portion 2A. The middle portion of the first cross member 2051 is supported on the body frame 2021 at the support portion 2A so as to turn about a turning axis (an example of an upper axis) which extends in the front-and-rear direction of the body frame 2021. Even when the steering shaft 2060 turns as the handlebar 2023 is steered, the first cross member 2051 does not turn about a turning axis of the steering shaft 2060. In this description, the description that the "first cross member 2051 or the like extends in the front-and-rear direction of the body frame 2021" indicates that the first cross member 2051 or the like extends while being inclined in relation to the front-and-rear direction of the body frame 2021 and additionally indicates that the first cross member 2051 or the like extends while being inclined substantially to the front-and-rear direction compared with the up-and-down direction and left-and-right direction of the body frame.

A right end portion of the first cross member 2051 is connected to an upper portion of the first side member 2053 by a connecting portion 2B. An upper portion of the first side member 2053 is supported on the body frame 2021 by the right end portion of the first cross member 2051 at the connecting portion 2B so as to turn about a turning axis which extends in the front-and-rear direction of the body frame 2021. A left end portion of the first cross member 2051 is connected to an upper portion of the second side member 2054 by a connecting portion 2C. The upper portion of the second side member 2054 is supported on the body frame 2021 by the left end portion of the first cross member 2051 at the connecting portion 2C so as to turn about a turning axis which extends in the front-and-rear direction of the body frame 2021.

Figure 18:
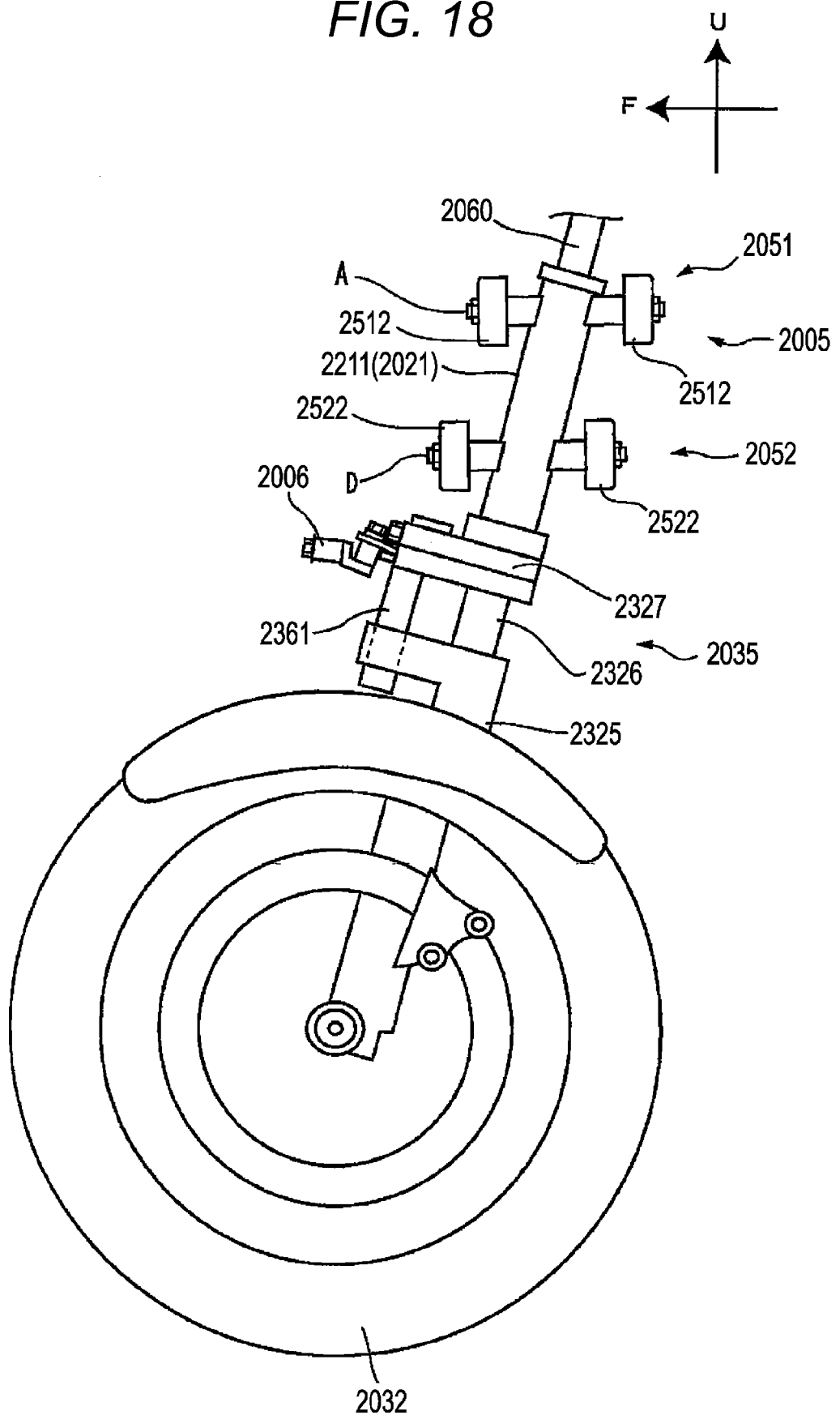
FIG. 18 is a left side view showing a portion of the vehicle shown in FIG. 16.

As shown in FIG. 18, the second cross member 2052 includes a pair of plate-shaped members 2522. The second cross member 2052 extends in the left-and-right direction of the body frame 2021. The pair of plate-shaped members 2522 sandwiches the headpipe 2211 therebetween in the front-and-rear direction of the body frame 2021. With the body frame 2021 resting in an upright state, the second cross member 2052 is disposed below the first cross member 2051 and above the first shock absorbing device 2033 and the second shock absorbing device 2035.

A middle portion of the second cross member 2052 is supported on the body frame 2021 (the headpipe 2211) by a support portion 2D. The middle portion of the second cross member 2052 is supported on the body frame 2021 at the support portion 2D so as to turn about a turning axis (an example of a lower axis) which extends in the front-and-rear direction of the body frame 2021. The turning axis which extends in the front-and-rear direction of the body frame 2021 at the support portion 2D is parallel or substantially parallel to the turning axis which extends in the front-and-rear direction of the body frame 2021 at the support portion 2A. Even when the steering shaft 2060 turns as the handlebar 2023 is steered, the second cross member 2052 does not turn about the turning axis of the steering shaft 2060.

A right end portion of the second cross member 2052 is connected to a lower portion of the first side member 2053 by a connecting portion 2E. A lower portion of the first side member 2053 is supported on the body frame 2021 by the right end portion of the second cross member 2052 at the connecting portion 2E so as to turn about a turning axis which extends in the front-and-rear direction of the body frame 2021. A left end portion of the second cross member 2052 is connected to a lower portion of the second side member 2054 by a connecting portion 2F. A lower portion of the second side member 2054 is supported on the body frame 2021 by the left end portion of the second cross member 2052 at the connecting portion 2F so as to turn about a turning axis which extends in the front-and-rear direction of the body frame 2021.

In the present preferred embodiment, the first cross member 2051 and the second cross member 2052 each include a pair of plate-shaped members which extend in the left-and-right direction, and the first cross member 2051 and the second cross member 2052 each preferably include a member which extends to the right from the headpipe 2211 and a member which extends to the left from the headpipe 2211.

The first side member 2053 is disposed directly to the right of the headpipe 2211. The first side member 2053 extends parallel or substantially parallel to a direction in which the headpipe 2211 and the steering shaft 2060 extend. The first side member 2053 is disposed directly above the first front wheel 2031 and the first shock absorbing device 2033. The first side member 2053 supports an upper portion of the first shock absorbing device 2033 so as to turn about a first center axis X (an example of a right axis).

The second side member 2054 is disposed directly to the left of the headpipe 2211. The second side member 2054 extends parallel or substantially parallel to a direction in which the headpipe 2211 and the steering shaft 2060 extend. The second side member 2054 is disposed directly above the second front wheel 20032 and the second shock absorbing device 2035. The second side member 2054 supports an upper portion of the second shock absorbing device 2035 so as to turn about a second center axis Y (an example of a left axis).

The steering shaft 2060 is supported on the body frame 2021 between the first side member 2053 and the second side member 2054 in the left-and-right direction of the body frame 2021. An upper end portion of the steering shaft 2060 is provided above a turning axis of a support portion 2D on the second cross member 2052 in the up-and-down direction of the body frame 2021. The steering shaft 2060 turns about a middle axis Z in the up-and-down direction of the body frame 2021 (the headpipe 2211). In this description, the description that the "middle axis Z or the like extends in the up-and-down direction of the body frame 2021" indicates that the middle axis or the like extends while being inclined in relation to the up-and-down direction of the body frame 2021 and additionally indicates that the middle axis Z or the like extends while being inclined substantially to the up-and-down direction compared with the front-and-rear direction and left-and-right direction of the body frame.

Figure 19:
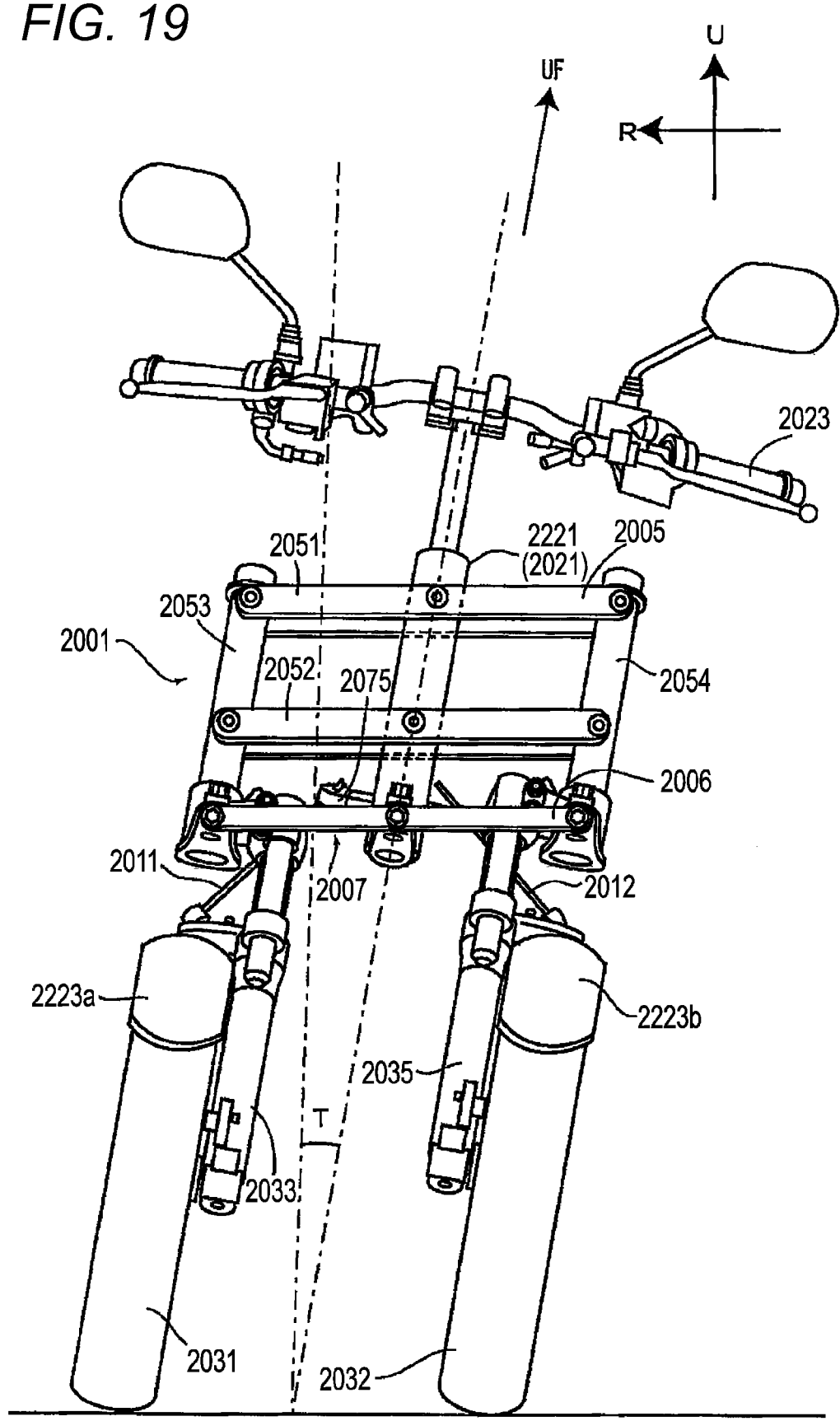
FIG. 19 is a front view of the vehicle shown in FIG. 16 which shows the vehicle in a leaned state.

FIG. 19 is a front view of the vehicle showing a state in which the body frame 2021 is leaned to the left by an angle T. An arrow UF denotes an upward direction of the body frame 2021. With the three-wheeled vehicle 2001 resting in the upright state, an upward direction UF of the body frame 2021 and a vertically upwards direction U coincide with each other. With the three-wheeled vehicle 2001 resting in a leaned state, the upward direction UF of the body frame 2021 and the vertically upwards direction U differ from each other.

When the body frame 2021 is leaned in the left-and-right direction, the link mechanism 2005 is deformed. When the rider attempts to lean the three-wheeled vehicle 2001 to the left by the angle T, the body frame 2021 (the headpipe 2211) leans to the left from the upright posture. In association with the tilting of the body frame 2021, the first cross member 2051 and the second cross member 2052 turn relative to the headpipe 2211, the first side member 2053, and the second side member 2054. As this occurs, directions in which the first cross member 2051 and the second cross member 2052 extend are parallel or substantially parallel in the front view. The left end portion of the first cross member 2051 moves to the left more than the left end portion of the second cross member 2052 in association with the leaning of the headpipe 2211 to the left. This causes the second side member 2054 to lean to the left from the upright state. As this occurs, the direction in which the second side member 2054 extends is parallel or substantially parallel to the direction in which the headpipe 2211 extends in the front view. As the second side member 2054 does, the first side member 2053 leans to the left from the upright state. The direction in which the first side member 2053 extends is parallel or substantially parallel to the direction in which the headpipe 2211 extends in the front view. As the link mechanism 2005 described above is deformed, the second front wheel 2032 is displaced upward (in the direction indicated by the arrow UF) in the upward direction of the body frame 2021 than the first front wheel 2031, such that the leaning of the three-wheeled vehicle 2001 to the left side is permitted.

Similarly, when the rider attempts to lean the three-wheeled vehicle 2001 to the right, the body frame 2021 (the headpipe 2211) leans to the right from the upright posture. In association with the tilting of the body frame 2021, the first cross member 2051 and the second cross member 2052 turn relative to the headpipe 2211, the first side member 2053, and the second side member 2054. As this occurs, directions in which the first cross member 2051 and the second cross member 2052 extend are parallel or substantially parallel in the front view. The left end portion of the first cross member 2051 moves to the right more than the left end portion of the second cross member 2052 in association with the leaning of the headpipe 2211 to the right. This causes the second side member 2054 to lean to the right from the upright posture. As this occurs, the direction in which the second side member 2054 extends is parallel or substantially parallel to the direction in which the headpipe 2211 extends in the front view. As the second side member 2054 does, the first side member 2053 also leans to the right from the upright posture. The direction in which the first side member 2053 extends is parallel or substantially parallel to the direction in which the headpipe 2211 extends in the front view. As the link mechanism 2005 described above is deformed, the first front wheel 2031 is displaced upward in the upward direction of the body frame 2021 than the second front wheel 2032, such that the leaning of the three-wheeled vehicle 2001 to the right is permitted.

The operation force transfer mechanism 2006, which is an example of a turning transmission mechanism, transfers a turning motion of the steering shaft 2060 which corresponds to an operation of the handlebar 2023 to the first shock absorbing device 2033 and the second shock absorbing device 2035 so as to turn the first shock absorbing device 2033 and the second shock absorbing device 2035 about the first center axis X and the second center axis Y, respectively. A portion of the operation force transfer mechanism 2006 is disposed directly below the second cross member 2052. The operation force transfer mechanism 2006 is disposed above the first front wheel 2031 and the second front wheel 2032.

The first bracket 2335 is attached to the first side member 2053 so as to turn about the first center axis X relative to the first side member 2053. The operation force transfer mechanism 2006 connects a lower end portion of the steering shaft 2060 and the first bracket 2335 which together define a portion of the first shock absorbing device 2033. The operation force transfer mechanism 2006 transfers a turning motion of the steering shaft 2060 which is triggered by the steering of the handlebar 2023 to the first bracket 2335. The first bracket 2335 turns about the first center axis X relative to the first side member 2053. The first side member 2053 does not turn relative to the body frame 2021 even though the handlebar 2023 is steered.

The second bracket 2327 is attached to the second side member 2054 so as to turn about the second center axis Y relative to the second side member 2054. The operation force transfer mechanism 2006 connects the lower end portion of the steering shaft 2060 and the second bracket 2327 which together define a portion of the second shock absorbing device 2035. The operation force transfer mechanism 2006 transfers a turning motion of the steering shaft 2060 which is triggered by the steering of the handlebar 2023 to the second bracket 2327. The second bracket 2327 turns about the second center axis Y relative to the second side member 2054. The second side member 2054 does not turn relative to the body frame 2021 even though the handlebar 2023 is steered.

In this description, a portion which is fixed to the first shock absorbing device 2033 and which turns together with the first shock absorbing device 2033 is understood to define a portion of the first shock absorbing device 2033. Consequently, a first plate 2333a defines a portion of the first shock absorbing device 2033. Similarly, a portion which is fixed to the second shock absorbing device 2035 and which turns together with the second shock absorbing device 2035 is understood to define a portion of the second shock absorbing device 2035. Consequently, a second plate 2325a defines a portion of the second shock absorbing device 2035.

A deformation suppressing mechanism 2007, which is an example of a resisting force change mechanism, suppresses the deformation of the link mechanism 2005. Specifically, the deformation suppressing mechanism 2007 changes a resisting force that is to be imparted to a turning operation of the first cross member 2051 and a second cross member 2052 relative to the body frame 2021. As shown in FIG. 17, the deformation suppressing mechanism 2007 includes a first connecting member 2011 (an example of an extended member), a second connecting member 2012 (an example of an extended member), and a suppressing mechanism 2075.

The first connecting member 2011 is attached to the first plate 2333a. The first connecting member 2011 is attached to a first connecting point 2333c where the first plate 2333a intersects the first center axis X. Here, the first connecting member 2011 may not be attached to a position where the first connecting member 2011 coincides strictly with the first connecting point 2333c. That is, the first connecting member 2011 may be disposed in a position where the first connecting member 2011 is slightly offset from the first connecting point 2333c. The first connecting member 2011 is attached to an upper surface of the first plate 2333a. The first connecting member 2011 extends from the first plate 2333a towards the headpipe 2211.

The second connecting member 2012 is attached to the second plate 2325a. In the second connecting member 2012, the second plate 2325a is attached to a second connecting point 2325c where the second plate 2325a intersects the second center axis Y. Here, the second connecting member 2012 may not be attached to a position where the second connecting member 2012 coincides strictly with the second connecting point 2325c. That is, the second connecting member 2012 may be disposed in a position where the second connecting member 2012 is slightly offset from the second connecting point 2325c. The second connecting member 2012 is attached to an upper surface of the second plate 2325a. The second connecting member 2012 extends from the second plate 2325a towards the headpipe 2211.

The suppressing mechanism 2075 suppresses the movement of the first connecting member 2011 relative to the headpipe 2211. The suppressing mechanism 2075 suppresses the movement of the second connecting member 2012 relative to the headpipe 2211.

Figure 20:
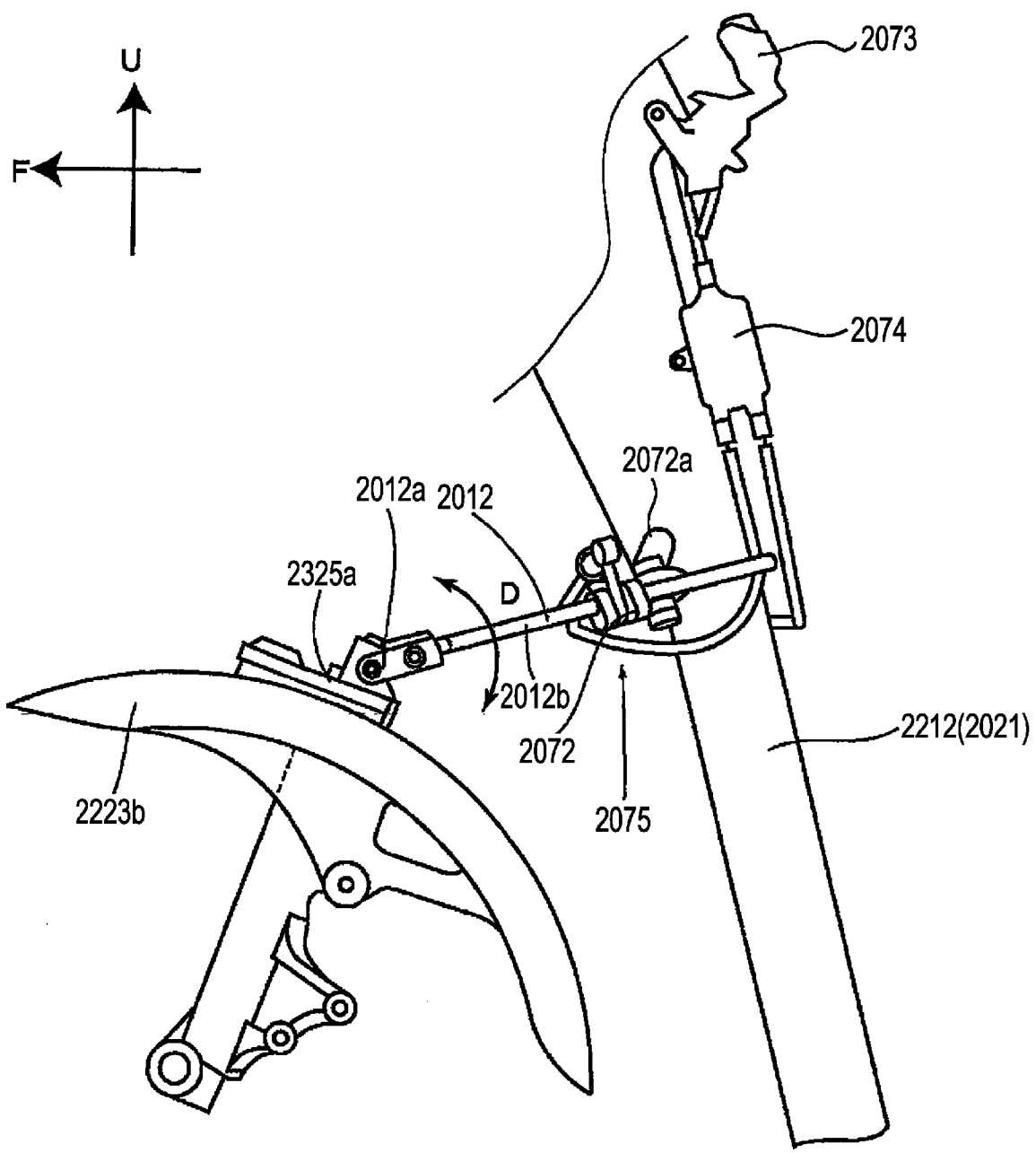
FIG. 20 is a left side view showing a portion of a deformation suppressing mechanism in the vehicle shown in FIG. 16.

FIG. 20 is a left side view showing a portion of the suppressing mechanism 2075. The suppressing mechanism 2075 includes calipers 2072 (an example of a frictional force change member), a lever 2073, and a connecting mechanism 2074. The calipers 2072 are disposed individually rightward and directly to the left of the headpipe 2211. However, in FIG. 20, only a left caliper 2072 is shown. Since the first connecting member 2011 preferably has the same configuration as that of the second connecting member 2012, the description thereof will be omitted herein. FIG. 20 shows only the second connecting member 2012 which is disposed on the left.

The second connecting member 2012 includes a turning support portion 2012a and a pole 2012b. The turning support portion 2012a supports one end of the pole 2012b. The turning support portion 2012a supports the pole 2012b so that the pole 2012b is able to turn in a direction indicated by an arrow D2 about a turning shaft (an example of a first support portion) which extends in the left-and-right direction of the body frame 2021. The pole 2012b extends upwards and rearwards from the second plate 2325a. A rear end of the pole 2012b is made free. The caliper 2072 includes a guide member which guides the pole 2012b of the second connecting member 2012. A portion of the pole 2012b is supported by the caliper 2072. An end portion located near to the free end of the pole 2012b is guided by the guide member. The pole 2012b and the caliper 2072 are able to be displaced relative to each other.

Figure 21:
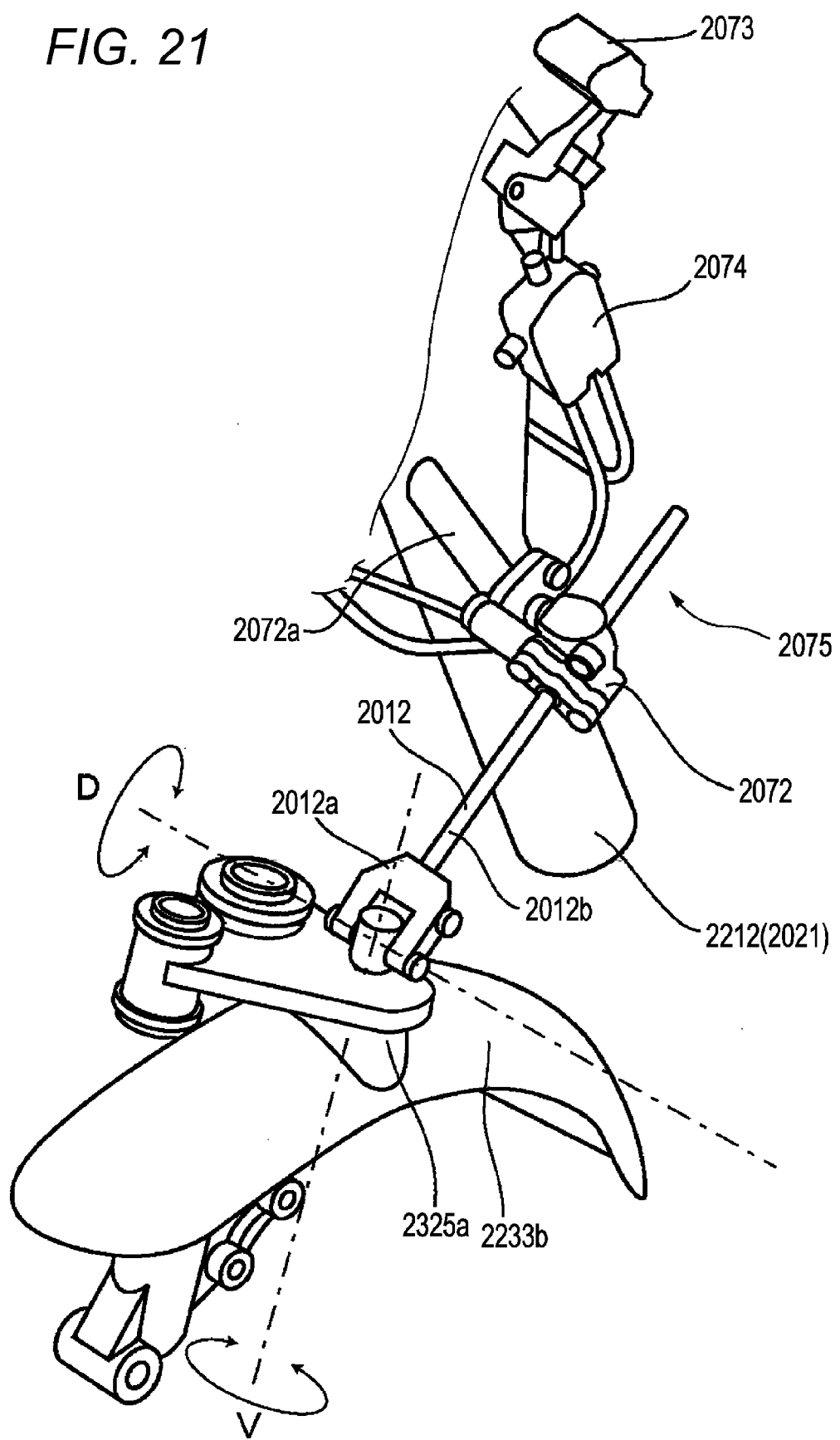
FIG. 21 is a perspective view showing a portion of the deformation suppressing mechanism in the vehicle shown in FIG. 16.

FIG. 21 is a perspective view showing a portion of the suppressing mechanism 2075. The turning support portion 2012a supports the pole 2012b so as to turn in the direction indicated by the arrow D2 and also supports the pole 2012b so as to turn in a direction indicated by an arrow V2. The arrow V2 indicates a direction in which the pole 2012b turns about a turning axis (an example of a first support portion) which extends in the up-and-down direction of the body frame 2021. The caliper 2072 is disposed farther transversely outwards than a down frame 2212. The caliper 2072 includes a support member 2072a. The support member 2072a is connected to the body frame 2021 (an example of a second support portion). The lever 2073 is disposed directly behind the down frame 2212.

The lever 2073 is used in operating the caliper 2072. The lever 2073 is connected to a connecting mechanism 2074. The lever 2073 is attached to the body cover 2022.

The connecting mechanism 2074 connects together the lever 2073 and the caliper 2072. The connecting mechanism 2074 operates the caliper 2072 so as to hold the pole 2012b of the second connecting member 2012 when the lever 2073 is operated.

As a result of the caliper 2072 holding the pole 2012b, a frictional force is increased which is exerted to a relative displacement between the second connecting member 2012 and the caliper 2072. This suppresses the relative movement between the second connecting member 2012 and the caliper 2072. Similarly, a relative movement between the first connecting member 2011 and the caliper 2072 is suppressed. That is, the caliper 2072 suppresses the movement of the first connecting member 2011 and the second connecting member 2012 relative to the headpipe 2211 when the lever 2073 is operated.

When attempting to suppress the leaning (that is, the deformation of the link mechanism 2005) of the three-wheeled vehicle 2001 (for parking the vehicle), the rider operates the lever 2073. When the lever 2073 is operated, the caliper 2072 suppresses the movement of the first connecting member 2011 and the second connecting member 2012 relative to the headpipe 2211. This suppresses the movement of the first front wheel 2031 and the second front wheel 2032 in the up-and-down direction of the body frame 2021 to suppress the deformation of the link mechanism 2005. Since the deformation of the link mechanism 2005 is suppressed, the three-wheeled vehicle 2001 is restrained from leaning more than the current state.

The three-wheeled vehicle 2001 of the second preferred embodiment includes the deformation suppressing mechanism 2007 which includes the first connecting member 2011, the second connecting member 2012, the caliper 2072, and the guide member. The first connecting member 2011 and the second connecting member 2012 are supported on the turning shafts provided on the first plate 2333a of the first shock absorbing device 2033 and the second plate 2325a of the second shock absorbing device 2035 at the one end portions thereof for turning about the support axes of the turning shafts. The calipers 2072 are supported on the body frame 2021 which are able to be displaced relative to the first plate 2333a of the first shock absorbing device 2033 and the second plate 2325a of the second shock absorbing device 2035 to change the frictional force between the first connecting member 2011 and the second connecting member 2012. The guide members guide the other end portions of the first connecting member 2011 and the second connecting member 2012 to the calipers 2072. The link mechanism 2005 operates when the resisting force exerted by the deformation suppressing mechanism 2007 is zero or small. In the case of the resisting force exerted by the deformation suppressing mechanism 2007 being large, the operation of the link mechanism 2005 is suppressed or stopped. Since the three-wheeled vehicle 2001 uses the first connecting member 2011 and the second connecting member 2012, and the calipers 2072 which change the frictional force by mechanical contact, it is easy to make the frictional force zero or very small. Because of this, the deformation suppressing mechanism 2007 makes the link mechanism 2005 operate smoothly when the resisting force exerted by the deformation suppressing mechanism 2007 is zero or small.

Further, the turning angle of the first connecting member 2011 relative to the first plate 2333a of the first shock absorbing device 2033 or the turning angle of the second connecting member 2012 relative to the second plate 2325a of the second shock absorbing device 2035 based on the turning operation of the first cross member 2051 and the second cross member 2052 relative to the body frame 2021 is smaller than the turning angle of the first cross member 2051 or the turning angle of the second cross member 2052 relative to the body frame 2021 resulting from the turning operation. This prevents enlargement of the movable range of the deformation suppressing mechanism 2007 based on the turning operation of the first cross member 2051 and the second cross member 2052 relative to the body frame 2021.

Thus, it is possible to prevent enlargement of the peripheral construction of the steering shaft 2060 which is above the two front wheels 2003 while ensuring the smooth operation of the link mechanism 2005 even though the function which suppresses the operation of the link mechanism 2005 is provided in the three-wheeled vehicle 2001 which is equipped with the leanable body frame 2021 and the two front wheels 2003.

In the configuration of the second preferred embodiment, the movement of the first front wheel 2031 and the second front wheel 2032 relative to the headpipe 2211 are suppressed in such a state that the first front wheel 2031 and the second front wheel 2032 are positioned differently in relation to the up-and-down direction of the body frame 2021. Therefore, the three-wheeled vehicle 2001 is able to be parked while being leaned or with one of the front wheels 2003 riding on a step.

In the configuration of the second preferred embodiment, a portion of the deformation suppressing mechanism 2007 is disposed below the second cross member 2052, and therefore, the center of gravity of the three-wheeled vehicle 2001 is lowered compared with the configuration in which the whole of the deformation suppressing mechanism 2007 is disposed above the second cross member 2052.

In the configuration of the second preferred embodiment, the turning support portion 2011a is disposed at the first connecting point 2333c. In addition, the turning support portion 2012a is disposed at the second connecting point 2325c. Hence, even though the first front wheel 2031 turns about the first center axis X and the second front wheel 2032 turns about the second center axis Y, the positions of the first connecting point 2333c and the second connecting point 2325c with respect to the headpipe 2211 are unchanged. Consequently, the turning of the first front wheel 2031 and the second front wheel 2032 is not interrupted by the first connecting member 2011 and the second connecting member 2012.

In addition, in the preferred embodiments of the present invention, the front-rear direction, the up-and-down direction and the left-and-right direction of the body frame mean the front-rear direction, the up-and-down direction and the left-and-right direction based on the body frame. The front-and-rear direction, the up-and-down direction and the left-and-right direction of the vehicle coincide with the front-and-rear direction, the up-and-down direction and the left-and-right direction of the body frame in the present invention with the body frame resting in the upright state.

The vehicle according to various preferred embodiments of the present invention is a vehicle equipped with the leanable body frame and the two front wheels. The number of rear wheels is not limited to one, and hence, may be two. The vehicle may include a body cover which covers the body frame. The vehicle may not include the body cover which covers the body frame. The power source of the vehicle is not limited to the engine, and hence, an electric motor may be used as the power source.

In the preferred embodiments of the present invention, the longitudinal direction of the extended member is basically a direction which connects a first end portion and a second end portion of the extended member. In the present invention, however, the shape of the extended member is not limited to the straight shape, and hence, the extended member may have a curved shape or a combination of the straight shape and the curved shape. Because of this, the longitudinal direction of the extended member includes a direction in which the extended member is inclined within a range of about ±40 degrees, for example, in addition to the single straight direction. When referred to in the description of various preferred embodiments of the present invention, the "direction" other than the longitudinal direction also includes the direction in which the extended member is inclined within the range of about ±40 degrees, for example. When referred to in the description of various preferred embodiments of the present invention, the "parallel" line also includes two straight lines which do not intersect each other as members while they are inclined within the range of about ±40 degrees, for example. When referred to in relation to the "direction," and the "member" in the description of various preferred embodiments of the present invention, the term "along" includes a case where the direction and the member are inclined within the range of about ±40 degrees, for example. When referred to in relation to the "direction" in the description of various preferred embodiments of the present invention, the term "extend" also includes a case where the direction is inclined within the range of about ±40 degrees, for example.

The terms and expressions which are used herein are used to describe the preferred embodiments of the present invention and hence should not be construed as limiting the scope of the present invention. It should be understood that any equivalents to the characteristic matters that are shown and described herein should not be excluded and that various modifications within the scope of claims to be made later are permitted.

The present invention can be embodied in many different forms. It should be understood that the disclosure made herein describes the preferred embodiments based on the principle of the present invention. Based on the understanding that the preferred embodiments which are described and/or illustrated herein are not intended to limit the present invention thereto, several preferred embodiments are described and illustrated herein.

Several illustrated preferred embodiments of the present invention are described herein. The present invention is not limited to those preferred embodiments described herein. The present invention includes every preferred embodiment which includes equivalent elements, modifications, deletions, combinations (for example, combination of characteristics of various preferred embodiments), improvements and/or alterations which those skilled in the art to which the present invention pertains can recognize based on the disclosure made herein. The limitative matters in claims should be construed broadly based on terms used in the claims and should not be limited to the preferred embodiments described in this description or those described during the prosecution of this patent application. The preferred embodiments should be construed to be non-exclusive. For example, in this disclosure, the terms "preferred," "preferable" and "good" should be construed as being non-exclusive and those terms mean, respectively, "preferred but not limited thereto," "preferable but not limited thereto" and "good but not limited thereto."

While the present invention has been described in detail and by reference to the specific preferred embodiments, various alterations or modifications can be made thereto.

This patent application claims priority benefit to Japanese Patent Application No. 2012-209873 filed on Sep. 24, 2012, Japanese Patent Application No. 2012-209874 filed on Sep. 24, 2012, and Japanese Patent Application No. 2012-279974 filed on Dec. 21, 2012, the contents of which are each incorporated herein by reference.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a body frame including a headpipe;
   a right front wheel and a left front wheel disposed side by side in a left-and-right direction of the body frame;
   a right shock absorbing device supporting the right front wheel at a lower portion thereof and configured to absorb a displacement of the right front wheel in an up-and-down direction of the body frame with respect to an upper portion thereof;
   a left shock absorbing device supporting the left front wheel at a lower portion thereof and configured to absorb a displacement of the left front wheel in the up-and-down direction of the body frame with respect to an upper portion thereof;
   a link mechanism including:
      a right side rod turnably supporting the upper portion of the right shock absorbing device around a right axis extending in the up-and-down direction of the body frame;
      a left side rod turnably supporting the upper portion of the left shock absorbing device around a left axis parallel or substantially parallel to the right axis;
      an upper cross member including a right end portion turnably supporting the upper portion of the right side rod, a left end portion turnably supporting the upper portion of the left side rod, and an intermediate portion turnably supported by the body frame around an upper axis extending in a front-and-rear direction of the body frame; and
      a lower cross member including a right end portion turnably supporting a lower portion of the right side rod, a left end portion turnably supporting a lower portion of the left side rod, and an intermediate portion turnably supported by the body frame around a lower axis which is parallel or substantially parallel to the upper axis;
   a steering shaft supported on the headpipe between the right side rod and the left side rod in the left-and-right direction of the body frame, and including an upper end portion above the lower axis which is a turning axis of the lower cross member in the up-and-down direction of the body frame, and is turnable with respect to the headpipe around an intermediate axis extending in the up-and-down direction of the body frame;
   a handlebar attached to the upper end portion of the steering shaft;
   a turning transmission mechanism configured to transfer a turning motion of the steering shaft corresponding to an operation of the handlebar to the right shock absorbing device and to the left shock absorbing device; and
   a resisting force changing mechanism configured to change a resisting force exerted against a turning operation of the upper cross member and the lower cross member with respect to the body frame; wherein
   the resisting force changing mechanism includes:
      an extended member including a first end supported on a first support portion on any one of the link mechanism, the body frame, the right shock absorbing device, and the left shock absorbing device, and which is turnable around a support axis of the first support portion;

a frictional force change member supported on a second support portion provided on any one of the link mechanism, the body frame, the right shock absorbing device, and the left shock absorbing device which are configured to be displaced relative to the first support portion, the frictional force change member being configured to change a frictional force with the extended member; and a guide member configured to guide a middle portion or a second end portion of the extended member to the frictional force change member; and a turning angle of the extended member relative to the first support portion resulting from a turning operation of the upper cross member and the lower cross member relative to the body frame is smaller than a turning angle of the upper cross member or a turning angle of the lower cross member relative to the body frame resulting from the turning operation.

2. The vehicle according claim 1, wherein at least a portion of the extended member is curved as seen from a view along the support axis of the first support portion.

3. The vehicle according to claim 1, wherein one of the extended member and the frictional force change member is supported on one of the upper cross member and the lower cross member; and in an upright state of the body frame, a distance between the first end and the second end of the extended member in the up-and-down direction is longer than a distance between the first end and the second end of the extended member in the left-and-right direction.

4. The vehicle according to claim 1, wherein one of the extended member and the frictional force change member is supported on any one of the body frame, the right side rod, and the left side rod; and in an upright state of the body frame, a distance between the first end and the second end of the extended member in the left-and-right direction is longer than a distance between the first end and the second end of the extended member in the up-and-down direction.

5. The vehicle according to claim 1, wherein the extended member is arranged directly behind the link mechanism in the front-and-rear direction of the body frame.

6. The vehicle according to claim 1, wherein the frictional force change member is arranged below the lower cross member in the up-and-down direction of the body frame.

7. The vehicle according to claim 1, wherein the body frame includes a down frame extending rearwards and downwards from the headpipe; and in a front view of the vehicle, the frictional force change member is arranged to a side of the down frame.

8. The vehicle according to claim 1, wherein the first support portion is provided on the lower cross member and in a position which spaced apart from the lower axis in a radial direction.

9. The vehicle according to claim 1, wherein a movable range of the extended member in the up-and-down direction based on the turning operation of the upper cross member and the lower cross member relative to the body frame is larger than a movable range of the extended member in a horizontal direction based on the turning operation of the upper cross member and the lower cross member relative to the body frame.

* * * * *